(12) United States Patent
Kitahara et al.

(10) Patent No.: US 9,088,802 B2
(45) Date of Patent: Jul. 21, 2015

(54) VIDEO ENCODING METHOD AND APPARATUS, VIDEO DECODING METHOD AND APPARATUS, PROGRAMS THEREFOR, AND STORAGE MEDIA FOR STORING THE PROGRAMS

(75) Inventors: Masaki Kitahara, Tokyo (JP); Kazuto Kamikura, Tokyo (JP); Yoshiyuki Yashima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 2813 days.

(21) Appl. No.: 10/586,235

(22) PCT Filed: Dec. 28, 2005

(86) PCT No.: PCT/JP2005/024093
§ 371 (c)(1),
(2), (4) Date: Jul. 17, 2006

(87) PCT Pub. No.: WO2006/073116
PCT Pub. Date: Jul. 13, 2006

(65) Prior Publication Data
US 2007/0189396 A1      Aug. 16, 2007

(30) Foreign Application Priority Data
Jan. 7, 2005    (JP) ................................. 2005-002423

(51) Int. Cl.
H04N 7/12          (2006.01)
H04N 11/02         (2006.01)
(Continued)

(52) U.S. Cl.
CPC ............. *H04N 19/91* (2014.11); *H04N 19/176* (2014.11); *H04N 19/51* (2014.11); *H04N 19/597* (2014.11); *H04N 19/61* (2014.11)

(58) Field of Classification Search
CPC ... H04N 19/597; H04N 19/176; H04N 19/91; H04N 19/61; H04N 19/51
USPC ...................................................... 375/240.14
See application file for complete search history.

(56) References Cited

U.S. PATENT DOCUMENTS

2003/0151529 A1    8/2003   Karczewicz
2004/0101058 A1*   5/2004   Sasai et al. ............... 375/240.26
2008/0018731 A1    1/2008   Era

FOREIGN PATENT DOCUMENTS

JP          6-225274 A          8/1994
JP          09-275578      *    4/1996
(Continued)

OTHER PUBLICATIONS

Richardson, "H.264 and MPEG-4 Compression", Wiley.*
(Continued)

*Primary Examiner* — Hee-Yong Kim
(74) *Attorney, Agent, or Firm* — Harness, Dickey & Pierce, P.L.C.

(57) ABSTRACT

A video encoding method for encoding a plurality of images as a video image. The method includes a reference parallax data setting step of setting reference parallax data which indicates a viewing difference between a first image and an already-encoded second image, in order to encode target encoding data assigned to a predetermined position in the first image; a corresponding position setting step of setting a corresponding position in the second image, which can correspond to the predetermined position, by using the reference parallax data; a code table setting step of setting a code table corresponding to target encoding data assigned to the corresponding position; and a target encoding data encoding step of encoding the target encoding data in the first image by using the code table.

22 Claims, 22 Drawing Sheets

(51) Int. Cl.
   H04N 11/04    (2006.01)
   H04N 19/91    (2014.01)
   H04N 19/597   (2014.01)
   H04N 19/176   (2014.01)
   H04N 19/51    (2014.01)
   H04N 19/61    (2014.01)

(56) References Cited

FOREIGN PATENT DOCUMENTS

| | | |
|---|---|---|
| JP | 9-261653 A | 10/1997 |
| JP | 9-275578 A | 10/1997 |
| JP | 2005-516497 A | 6/2005 |
| TW | 498682 B | 8/2002 |
| TW | 200601113 A | 1/2006 |
| WO | WO-03/063501 A | 7/2003 |

OTHER PUBLICATIONS

Jia, "Stereoscopic Video Coding Based on Global Displacement Compensated Prediction", ICIS-PCM 2003.*

Detlev Marpe, et.al., "Context-Based Adaptive Binary Arithmetic Coding in the H.264/AVC Video Compression Standard", IEEE Transactions on Circuits and Systems for Video Technology, vol. 13. No. 7, pp. 620-636, Jul. 2003.

Hideaki Kimata and Masaki Kitahara, "Preliminary results on multiple view video coding (3DAV)," document M10976, MPEG Redmond Meeting, Jul. 2004.

T. Shiodera, I. Matsuda, S. Itoh, "Lossless Video Coding Based on Motion Compensation and 3D Prediction~A Study on Context Modeling~", the proceedings of the FIT 2003, No. J-053, pp. 303-304, Sep. 2003.

Aljoscha Smolic, Thomas Sikora and Jens-Rainer Ohm, "Long-Term Global Motion Estimation and its Application for Sprite Coding, Content Description, and Segmentation", IEEE Transactions on Circuits and Systems for Video Technology, vol. 9, No. 8, pp. 1227-1242, Dec. 1999.

Hideaki Kimata, Masaki Kitahara, Kazuto Kamikura, Yoshiyuki Yashima, Toshiaki Fujii, and Masayuki Tanimoto, "System Design of Free Viewpoint Video Communication", The Fourth International Conference on Computer and Information Technology 2004 (CIT '04), Sep. 14, 2004, p. 52-59.

Kim, Yongtae, et al., "Efficient disparity vector coding for multiview sequences," Signal Processing: Image Communication, Elsevier Science Publishers, vol. 19, No. 6, Jul. 1, 2004, pp. 539-553.

Brunello, Dania, et al., "Lossless Compression of Video Using Temporal Information," IEEE Transactions on Image Processing, vol. 12, No. 2, Feb. 2003, pp. 132-139.

Matsuda, Ichiro, et al., "Lossless Video Coding Using Variable Block-Size MC and 3D Prediction Optimized for Each Frame," Proceedings of the European Signal Processing Conference (EUSIPCO), Sep. 6, 2004, pp. 1967-1970.

Aydinoglu, Haluk, et al., "Region-based Stereo Image Coding," Proceedings of the International Conference on Image Processing (ICIP), IEEE Comp. Soc. Press, vol. 2, Oct. 23, 1995, pp. 57-60.

Jiang, J., et al., "A Novel Predictive Coding Algorithm for 3-D Image Compression," IEEE Transactions on Consumer Electronics, vol. 43, No. 3, Aug. 1997, pp. 430-437.

* cited by examiner

VIDEO ENCODING METHOD AND APPARATUS, VIDEO DECODING METHOD AND APPARATUS, PROGRAMS THEREFOR, AND STORAGE MEDIA FOR STORING THE PROGRAMS

TECHNICAL FIELD

The present invention relates to a video encoding method and a relevant apparatus used for encoding multi-viewpoint video images, a video encoding program for implementing the video encoding method, a computer-readable storage medium which stores this program, a video decoding method and a relevant apparatus for decoding encoded data generated by such a video encoding technique, a video decoding program for implementing the video decoding method, and a computer-readable storage medium which stores this program.

Priority is claimed on Japanese Patent Application No. 2005-002423, filed Jan. 7, 2005, the content of which is incorporated herein by reference.

BACKGROUND ART

A multi-viewpoint video image indicates a plurality of video images obtained by a plurality of (video) cameras disposed at different positions, which photograph the same subject and background. Below, a video image obtained by one camera is called a "two-dimensional video image", and a set of two-dimensional video images obtained by photographing the same subject and background is called a "multi-viewpoint video image".

The two-dimensional video images included in the multi-viewpoint video image have strong temporal correlation. When the cameras are operated in synchronism with each other, frames are obtained by the cameras which photograph the subject and background in the exact same state; thus, there is strong correlation between the cameras.

A conventional technique relating to the coding of the two-dimensional video image will be discussed.

In a number of known two-dimensional video coding methods such as H.264, MPEG-4, or MPEG-2 which are international coding standards, highly efficient coding is performed using techniques such as motion compensation, orthogonal transformation, quantization, or entropy coding.

For example, in the case of H.264, "I frame" can be encoded using intra-frame correlation, "P frame" can be encoded using inter-frame correlation with respect to a plurality of past frames, and "B frame" can be encoded using inter-frame correlation with respect to past or future frames appearing at intervals.

The I frame is divided into blocks (called "macroblocks", each having a size of 16×16), and intra prediction is performed in each macroblock. In the intra prediction, each macroblock may be further divided into smaller blocks (called "sub-blocks" below) so that intra prediction may be performed in each sub-block.

In the P frame, intra prediction or inter prediction can be performed in each macroblock. The intra prediction for the P frame is similar to that for the I frame. In the inter prediction, motion compensation is performed. Also in the motion compensation, the macroblock can be divided into smaller blocks, and divided sub-blocks may have different motion vectors and different reference images (or pictures).

Also in the B frame, intra prediction or inter prediction can be performed. In the inter prediction for the B frame, not only a past frame but also a future frame can be a reference image (or picture) for motion compensation. For example, a frame configuration of "I frame→B frame→B frame→P frame" is encoded in the order of I→P→B→B. For the B frame, motion compensation can be performed with reference to the I frame and the P frame, and similarly in the P frame, sub-blocks obtained by dividing each macroblock may have different motion vectors.

When intra or inter prediction is performed, a prediction residual is obtained; however, in each macroblock, a prediction residual block is defined and subjected to DCT (discrete cosine transform) so as to perform quantization. More specifically, a macroblock having a block size of 16×16 is divided into sub-blocks, each having a size of 4×4, and 4×4 DCT is performed. The sequence of quantized values of DCT coefficients is represented using the following data:

(i) Coded block pattern: data for indicating in which block a DCT coefficient which is not zero (called a "non-zero coefficient") is present among four 8×8 blocks which can be defined in the relevant macroblock, (ii) Coded block flag: data for indicating in which 4×4 block the non-zero coefficient is present among four 4×4 blocks in the 8×8 block in which the non-zero coefficient is present, (iii) Significance map: data for indicating which coefficient is the non-zero coefficient among DCT coefficients which are present in the 4×4 block indicated by the coded block flag data.

(iv) Level data: data indicating the value of the non-zero coefficient indicated by the significance map data.

In addition to the data relating to the DCT coefficients, data indicating the method of dividing each macroblock into sub-blocks and the motion vectors are subjected to reversible encoding called "entropy encoding", and encoding is completed.

Here, data to be entropy-encoded other than quantized values in pixel area and quantized values of transformation coefficients resulting from orthogonal transformation applied to an image block (the quantized values correspond to the above level data for the case of the DCT coefficients) is called "auxiliary data" below. In the case of H.264, the following are examples of the auxiliary data other than those relating to the DCT coefficients. This auxiliary data is provided for each macroblock:

(i) Macroblock type or sub-macroblock type: the macroblock type is an index which indicates a combination of a designation whether intra prediction or inter prediction is performed in the macroblock, a prediction method, a block dividing method, and the like, and the sub-macroblock type is an index which indicates a combination of a prediction method in the sub block, a block dividing method, and the like, (ii) Reference image index: an index value of a reference image (or picture) used for motion compensation in each sub-block, and (iii) Motion vector in each sub-block: in H.264, the motion vector is represented as a residual of prediction using peripheral motion vectors.

A general explanation about entropy encoding will be provided below.

Entropy encoding is reversible encoding. Generally, reversible encoding is a process of converting a symbol to be encoded (which may be interpreted as a value extracted from a set of integers) to a bit sequence including digits 1 and 0. For example, when the symbol to be encoded is a value included in a set of integers "0, 1, 2, 3", reversible encoding is implemented by encoding the symbol to (i) 00 when the symbol is 0, (ii) 01 when the symbol is 1, (iii) 10 when the symbol is 2, and (iv) 11 when the symbol is 3. Such encoding is called fixed-length encoding. A set of codes for encoding the symbol (in this example, "00, 01, 10, 11") is called a "code table".

Fixed-length encoding is reversible encoding, however, the encoding efficiency is not good. In information theory, it is known that highly efficient reversible encoding can be performed by using a probability of symbol appearance (i.e., probability distribution with respect to the set of integers). Generally, a short code length is allocated to a symbol having a high probability of appearance, while a long code length is allocated to a symbol having a low probability of appearance. This is so that on an average, more efficient encoding can be performed in comparison with fixed-length encoding. As discussed above, reversible encoding using probability distribution is called "entropy encoding".

However, in order to perform such highly efficient entropy encoding, the probability distribution of the symbol to be encoded must be known before encoding. Therefore, conventionally, the probability distribution is experientially determined, or learned while executing encoding. In addition, there is a known method of obtaining an optimum code table based on the probability distribution of the symbol (i.e., a method using Huffman codes or arithmetic codes). Therefore, in the following explanation, the probability distribution is treated as an equivalent for the code table.

When entropy encoding is applied to the encoding of auxiliary data, pixel values, and transformation coefficient values of a video image, such data to be encoded has a different probability at a different position in an image. Therefore, in order to perform highly efficient encoding, it is necessary to switch the code table in accordance with the position in the image, so as to select an appropriate code table used for encoding.

In H.264, such switching is executed using a method called "CABAC (context-adaptive binary arithmetic coding)" (see Reference Document 1: Non-Patent Document 1 described later). Below, a general explanation of CABAC in H.264 will be provided in an example for encoding a macroblock type.

In CABAC, when the macroblock type of a macroblock is encoded, the code table is switched with reference to already-encoded macroblock types of macroblocks which are positioned above and left of the target macroblock.

FIG. 17 shows the concept of such a reference relationship. In FIG. 17, the macroblocks indicated by reference symbols A and B have a strong correlation with the target macroblock to be encoded.

In CABAC, an optimum code table is estimated using this correlation. Specifically, code tables are respectively assigned to all possible macroblock-type combinations between the macroblocks A and B, and the target macroblock type (to be encoded) is entropy-encoded using a code table (i.e., probability distribution) corresponding to the actual values of the macroblock types of the macroblocks A and B. Other data to be encoded is also entropy-encoded based on the same concept.

Next, conventional encoding of a multi-viewpoint video image will be discussed.

In the conventional encoding of a multi-viewpoint video image, in order to improve encoding efficiency using temporal correlation and parallactic (or inter-view) correlation (i.e., correlation between cameras) as described above, encoding employing temporal prediction and compensation between cameras is employed. Reference Document 2 (Non-Patent Document 2 described later) shows an example of such a method.

In the shown method, sets of frames called "GOPs" are classified into "Base GOPs" and "InterGOPs" so as to encode the GOPs. For the GOPs called "Base GOPs", all frames included in the GOP images obtained by the same camera are encoding by intra or inter prediction; however, for the GOPs called "InterGOPs", in addition to such intra or inter prediction, parallactic prediction using an image obtained by another camera may be used. Here, parallactic prediction means that when a macroblock of an image of a camera is encoded, an image obtained by another camera is used as a reference image so as to perform a process identical to motion compensation.

FIG. 18 shows an example of GOP configuration in this method. In this example, each GOP has two images (or pictures), and each arrow indicates reference relationship between images. In this method, temporal correlation and parallactic correlation are used for encoding, thereby obtaining an encoding efficiency higher than that obtained when using only temporal correlation.

Non-Patent Document 1: Detlev Marpe, et. al., "Context-Based Adaptive Binary Arithmetic Coding in the H.264/AVC Video Compression Standard", IEEE Transactions on Circuits and Systems for Video Technology, Vol. 13. No. 7, pp. 620-636, July, 2003.

Non-Patent Document 2: Hideaki Kimata and Masaki Kitahara, "Preliminary results on multiple view video coding (3DAV)," document M10976, MPEG Redmond Meeting, July, 2004.

However, in the method disclosed by Reference Document 2, when a target multi-viewpoint video image is encoded, whether encoding is performed using temporal correlation or parallactic correlation is determined first based on an encoding efficiency, and if it is determined once that the encoding is performed using temporal correlation, parallactic correlation will never be considered in actual encoding.

In this case, if temporal variation in the subject and background is not so large in the multi-viewpoint video image to be encoded and thus temporal correlation is stronger than parallactic correlation, this method of Reference Document 2 cannot improve the encoding efficiency in comparison with a method using only temporal correlation.

This is because when the method of Reference Document 2 is applied to such a multi-viewpoint video image, temporal prediction is always used and encoding almost identical to the method using only temporal correlation is performed.

However, even when only temporal correlation is performed, auxiliary data such as a prediction residual, coefficients of orthogonal transformation, motion vectors, or macroblock types has correlation between cameras which may be used in encoding of such data.

On the other hand, regarding encoding in which a prediction error in motion compensation is quantized in a pixel area and an obtained quantized value is encoded, a method for encoding a two-dimensional image disclosed in Reference Document 3 (T. Shiodera, I. Matsuda, S. Itoh, "Lossless Video Coding Based on Motion Compensation and 3D Prediction~A Study on Context Modeling~", the proceedings of the FIT 2003, No. J-053, pp. 303-304, September, 2003) may be used.

In the method of Reference Document 3, when a quantized value of a prediction residual is entropy-encoded, a motion vector obtained for each block is used for referring to a quantized value of a previous frame which has been encoded, so as to switch the code table.

Specifically, when given a position (x, y) of a target pixel to be encoded and a motion vector $(m_x, m_y)$ of a block which includes this pixel, quantized values corresponding to pixels in the vicinity of the position $(x+m_x, y+m_y)$ in the previous frame are referred to so as to switch the code table. The quantized values corresponding to the pixels in the vicinity of the position ($x+m_x$, $y+m_y$) have correlation with the quantized value of the target pixel to be encoded; thus, the encoding efficiency can be improved using this method.

When this method is applied to entropy encoding of the quantized value of a prediction residual (in a pixel area) in a multi-viewpoint video image, a parallax (or disparity) vector for the same frame with respect to adjacent cameras is obtained for each block, and the process performed with respect to time using the method of Reference Document 3 may be performed with respect to parallax.

However, in such an easily analogized method, although the encoding efficiency of the quantized value itself of the prediction residual can be improved, the parallax vector for each block should be encoded; thus, it is difficult to improve the overall encoding efficiency.

Also in such an easily analogized method, it is impossible to efficiently encode data to be encoded (e.g., auxiliary data such as coefficients of orthogonal transformation, motion vectors, or macroblock types) other than the prediction residual in the pixel area. This is because there is no correlation between the prediction residual in the pixel area and other data to be encoded.

DISCLOSURE OF INVENTION

In light of the above circumstances, an object of the present invention is to provide a novel coding technique which can be applied to coding a multi-viewpoint video image, which enables entropy encoding using parallactic correlation, thereby improving the encoding efficiency of any kind of multi-viewpoint video images which includes a multi-viewpoint video image for which encoding efficiency cannot be improved using conventional parallactic prediction.

Therefore, the present invention provides a video encoding method for encoding a plurality of images as a video image, the method comprising:

a reference parallax data setting step of setting reference parallax data which indicates a viewing difference between a first image and an already-encoded second image, in order to encode target encoding data assigned to a predetermined position in the first image;

a corresponding position setting step of setting a corresponding position in the second image, which can correspond to the predetermined position, by using the reference parallax data;

a code table setting step of setting a code table corresponding to target encoding data assigned to the corresponding position; and a target encoding data encoding step of encoding the target encoding data in the first image by using the code table.

In a typical example, in the reference parallax data setting step, global parallax data indicating an average viewing difference between the first image and the second image is determined as the reference parallax data, and the video encoding method further comprises:

a global parallax data encoding step of encoding the global parallax data.

In another typical example, in the reference parallax data setting step, the second image and a third image are used for estimating parallax between the first and second images, and the reference parallax data is set based on the estimated parallax and a positional relationship between imaging devices which obtained the first to third images.

In accordance with the present invention having the above-described structure, it is possible not to encode the reference parallax data (i.e., data such as a parallax vector, which indicate an amount of parallax), or to reduce the amount of encoded reference parallax data. It is also possible to encode target encoding data (i.e., data to be encoded) by using parallactic correlation, thereby efficiently encoding a plurality of video images (e.g., a multi-viewpoint video image).

In order to execute encoding based on the above method, instead of obtaining parallax data for each block, parallax data which indicates a viewing difference between different cameras, or one average parallax data (i.e., global parallax data) is obtained for one image.

When camera parameters of each camera are known and decoded images of two or more different cameras can be referred to, parallax data (i.e., a parallax vector) for each pixel in an image to be encoded (i.e., the first image) can be estimated without referring to the image to be encoded.

In addition, when cameras are aligned with parallel visual axes, a series of images respectively obtained by the cameras at the same time is equivalent to a video image obtained by photographing a subject which performs parallel translation. Therefore, in this case, an approximation to local parallax data can be obtained using only the reference parallax data.

The code table used for entropy-encoding the target encoding data is switched or selected with reference to the target encoding data of another image, by using the above parallax data.

In a preferable example, the code table set in the code table setting step corresponds to the target encoding data at the corresponding position in the second image and target encoding data which has been encoded and is assigned to a position in the vicinity of the predetermined position in the first image.

In another preferable example, in the code table setting step, the code table is set by also referring to target encoding data assigned to a position in the vicinity of the corresponding position in the second image. Accordingly, robust code-table switching is possible.

Therefore, even with an influence of the accuracy of the reference parallax data, or the like, statistical dispersion in data of the predetermined position in the first image can be handled when setting the corresponding position in the second image.

That is, the code table can be set by referring to a plurality of the (peripheral) corresponding positions, thereby canceling such an influence of the accuracy of the reference parallax data, or the like.

In a typical example:

the target encoding data is defined for each block obtained by dividing the relevant image; and in the corresponding position setting step, the position of a block in the second image, which corresponds to the predetermined position, is shifted based on the reference parallax data, and the position of a block having a maximum overlapping area with the shifted block is determined as the corresponding position.

In this case, in the code table setting, the code table is switched by referring to the target encoding data of the block at the relevant corresponding position. Accordingly, in block-base encoding, it is possible to efficiently encode the target encoding data necessary for each block (i.e., coefficients of orthogonal transformation, macroblock types, or the like).

In another typical example:

the target encoding data is defined for each block obtained by dividing the relevant image; and in the corresponding position setting step, the position of a block in the second image, which corresponds to the predetermined position, is shifted based on the reference parallax data, and a set of positions of a plurality of blocks in the vicinity of the shifted position is determined as the corresponding position.

In this case, in the code table setting, the code table is switched by referring to the target encoding data of the plurality of the blocks. Accordingly, in block-base encoding, it is possible to perform robust code-table switching due to a reason as discussed above.

In addition, the code table set in the code table setting step may correspond to a most frequently appearing value of the target encoding data used for setting the code table.

Accordingly, it is possible to efficiently encode the target encoding data (such as a macroblock type or a prediction mode) which is represented as a numeric value just as an index and thus whose dimension cannot be defined, while preventing the number of the code tables from explosively increasing.

That is, with given N which means the number of the corresponding positions to be referred to, in order to prepare code tables respectively corresponding to all combinations between N symbols, $c^{N-1}$ code tables are necessary, where c indicates the number of the code tables when the number of the corresponding positions to be referred to is 1. Therefore, in this case, the number of the code tables increases exponentially. In contrast, in accordance with the above structure, the code table is switched by referring to the most frequently appearing value of the target encoding data corresponding to a plurality of the corresponding positions; thus, the number of the code table is just c.

In addition, the code table set in the code table setting step may correspond to an average value of the target encoding data used for setting the code table.

Accordingly, it is possible to efficiently encode the target encoding data (such as a quantized value of a coefficient of orthogonal transformation or the number of non-zero coefficients) whose dimension can be defined, while preventing the number of the code tables from explosively increasing.

As described above, with given N which means the number of the corresponding positions to be referred to, in order to prepare code tables respectively corresponding to all combinations between N symbols, $c^{N-1}$ code tables are necessary, where c indicates the number of the code tables when the number of the corresponding positions to be referred to is 1. Therefore, in this case, the number of the code tables increases exponentially. In contrast, in accordance with the above structure, the code table is switched by referring to the average value of the target encoding data corresponding to a plurality of the corresponding positions; thus, the number of the code table is just c.

The present invention also provides a video decoding method for decoding encoded data generated by encoding a plurality of images as a video image, the method comprising:

a reference parallax data setting step of setting reference parallax data which indicates a viewing difference between a first image and an already-encoded second image, in order to decode target encoding data assigned to a predetermined position in the first image;

a corresponding position setting step of setting a corresponding position in the second image, which can correspond to the predetermined position, by using the reference parallax data;

a code table setting step of setting a code table corresponding to target encoding data assigned to the corresponding position; and a target encoding data decoding step of decoding the target encoding data in the first image by using the code table.

In a typical example, in the reference parallax data setting step, global parallax data indicating an average viewing difference between the first image and the second image is decoded, and this decoded data is used as the reference parallax data.

In another typical example, in the reference parallax data setting step, the second image and a third image are used for estimating parallax between the first and second images, and the reference parallax data is set based on the estimated parallax and a positional relationship between imaging devices which obtained the first to third images.

In a preferable example, the code table set in the code table setting step corresponds to the target encoding data at the corresponding position in the second image and target encoding data which has been decoded and is assigned to a position in the vicinity of the predetermined position in the first image.

In another preferable example, in the code table setting step, the code table is set by also referring to target encoding data assigned to a position in the vicinity of the corresponding position in the second image.

In a typical example:

the target encoding data is defined for each block obtained by dividing the relevant image; and in the corresponding position setting step, the position of a block in the second image, which corresponds to the predetermined position, is shifted based on the reference parallax data, and the position of a block having a maximum overlapping area with the shifted block is determined as the corresponding position.

In another typical example:

the target encoding data is defined for each block obtained by dividing the relevant image; and in the corresponding position setting step, the position of a block in the second image, which corresponds to the predetermined position, is shifted based on the reference parallax data, and a set of positions of a plurality of blocks in the vicinity of the shifted position is determined as the corresponding position.

In addition, the code table set in the code table setting step may correspond to a most frequently appearing value of the target encoding data used for setting the code table, or to an average value of the target encoding data used for setting the code table.

The present invention also provides a video encoding apparatus for encoding a plurality of images as a video image, the apparatus comprising:

a reference parallax data setting part for setting reference parallax data which indicates a viewing difference between a first image and an already-encoded second image, in order to encode target encoding data assigned to a predetermined position in the first image;

a corresponding position setting part for setting a corresponding position in the second image, which can correspond to the predetermined position, by using the reference parallax data;

a code table setting part for setting a code table corresponding to target encoding data assigned to the corresponding position; and a target encoding data encoding part for encoding the target encoding data in the first image by using the code table.

In a typical example, the reference parallax data setting part determines global parallax data indicating an average viewing difference between the first image and the second image as the reference parallax data, and the video encoding apparatus further comprises:

a global parallax data encoding part for encoding the global parallax data.

In another typical example, the reference parallax data setting part uses the second image and a third image so as to estimate parallax between the first and second images, and the reference parallax data is set based on the estimated parallax and a positional relationship between imaging devices which obtained the first to third images.

The present invention also provides a video decoding apparatus for decoding encoded data generated by encoding a plurality of images as a video image, the apparatus comprising:

a reference parallax data setting part for setting reference parallax data which indicates a viewing difference between a first image and an already-encoded second image, in order to decode target encoding data assigned to a predetermined position in the first image;

a corresponding position setting part for setting a corresponding position in the second image, which can correspond to the predetermined position, by using the reference parallax data;

a code table setting part for setting a code table corresponding to target encoding data assigned to the corresponding position; and a target encoding data decoding part for decoding the target encoding data in the first image by using the code table.

In a typical example, the reference parallax data setting part decodes global parallax data indicating an average viewing difference between the first image and the second image, and this decoded data is used as the reference parallax data.

In another typical example, the reference parallax data setting part uses the second image and a third image so as to estimate parallax between the first and second images, and the reference parallax data is set based on the estimated parallax and a positional relationship between imaging devices which obtained the first to third images.

Each method of the present invention can be implemented using a computer program which may be stored in an appropriate computer-readable storage medium to be provided or may be provided via a network. In order to implement the present invention, the program may be installed and operated by a control device such as a CPU.

As explained above, in accordance with the present invention, parallactic correlation can be used in entropy encoding of a multi-viewpoint video image (conventionally, the encoding efficiency of such an image cannot be improved due to parallactic prediction). Therefore, it is possible to improve the encoding efficiency of any kind of multi-viewpoint video images.

BEST MODE FOR CARRYING OUT THE INVENTION

Below, the present invention will be explained in detail in accordance with its embodiments.

FIGS. 1A and 1B and FIGS. 2A and 2B show examples of the reference relationship for switching the code table. In these figures, for convenience of explanation, a global parallax vector (i.e., global parallax data) is used as reference parallax data.

These figures relate to the encoding of images obtained using two cameras (camera C1 and camera C2). Target encoding data with respect to the camera C1 ("target encoding data" indicates all data to be entropy-encoded, that is, a prediction residual, coefficients of orthogonal transformation, macroblock types, or the like) is encoded without referring to the target encoding data for the camera C2, while the target encoding data for the camera C2 is entropy-encoded by referring to the target encoding data of the camera C1, which has already been encoded.

Figure 1A:
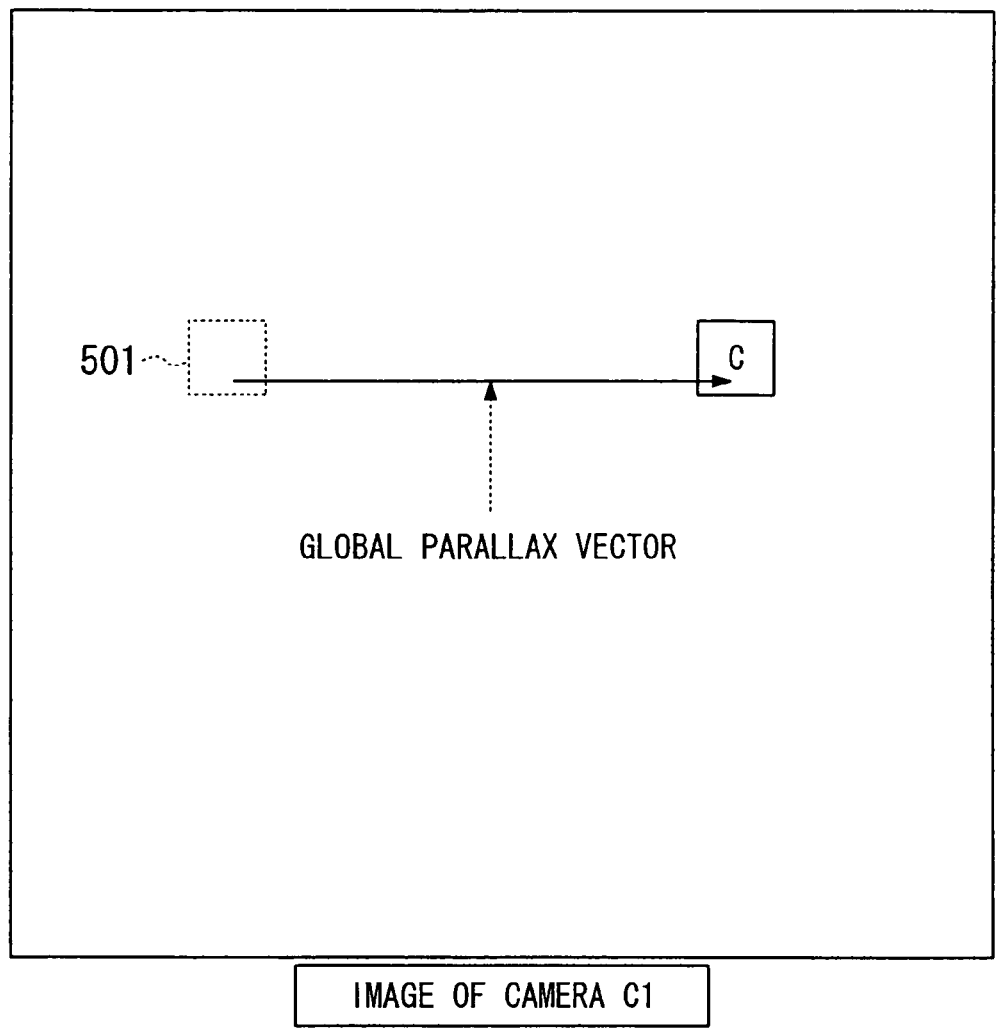
FIG. 1A is a drawing showing an example of the reference relationship with respect to the target encoding data for switching the code table.
Figure 1B:
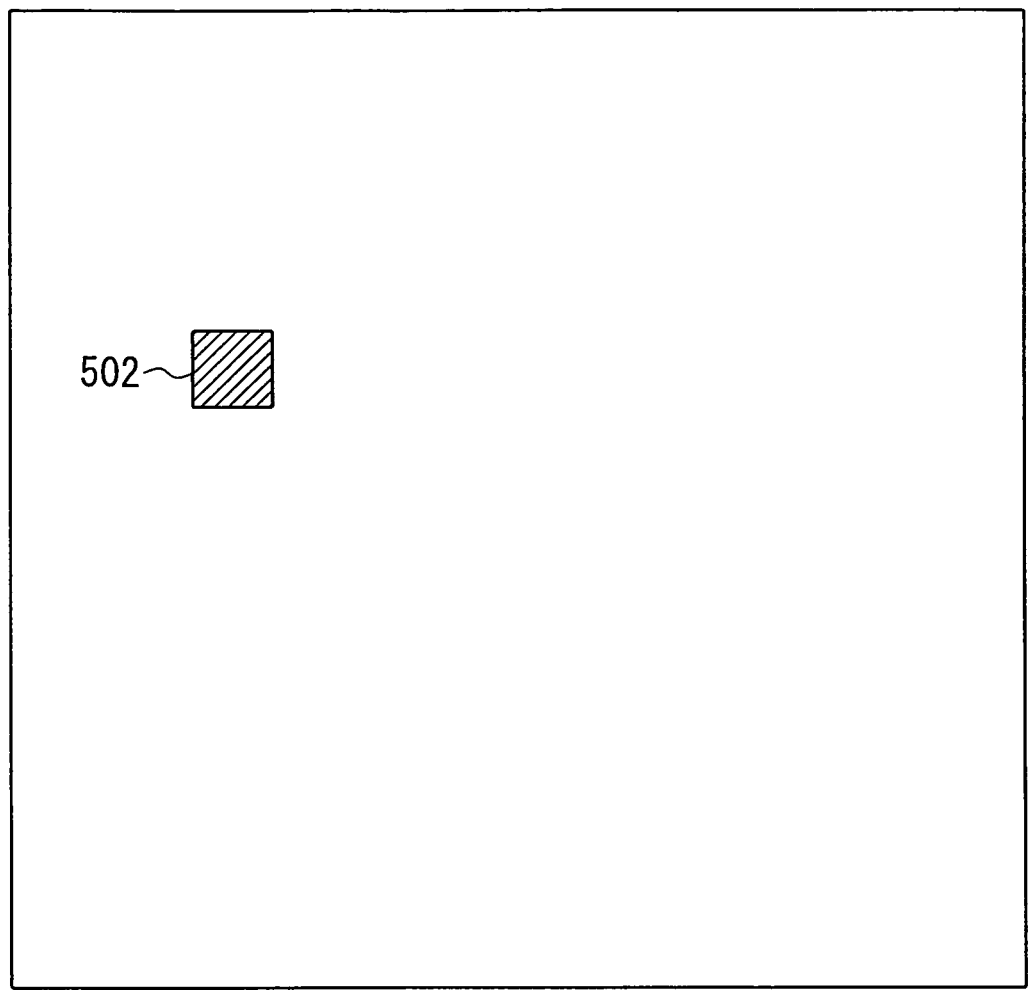
FIG. 1B is also a drawing showing the example of the reference relationship for the target encoding data for switching the code table.

In the example shown in FIGS. 1A and 1B, the present target encoding data of the camera C2 belongs to a block 502 (in this example, block-base encoding as defined in MPEG-2 is assumed), and a position 501 in an image of the camera C1 corresponds to the position of the block 502. A position is specified by shifting the position 501 by a distance corresponding to the global parallax vector, and a code table is selected in accordance with the target encoding data of a block (indicated by reference symbol C in FIG. 1A) corresponding to this specified position and the present target encoding data is encoded using this code table.

In the above example, when specifying a block corresponding to the position specified by shifting the position 501 (which corresponds to the block 502) by a distance corresponding to the global parallax vector, preferably, the position of a block which has a maximum overlapping area with the shifted block (501) is determined as a "corresponding position".

Figure 2A:
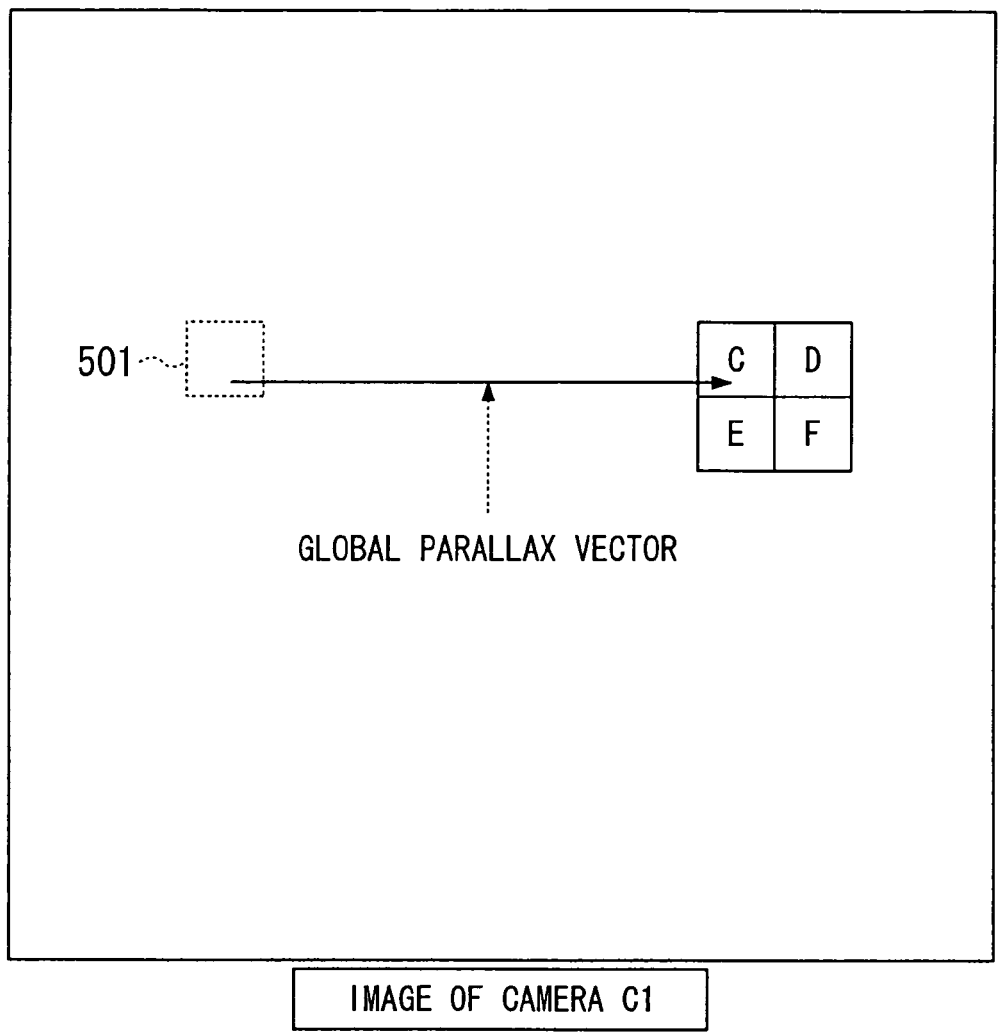
FIG. 2A is a drawing showing an example of the reference relationship with respect to the target encoding data for switching the code table.
Figure 2B:
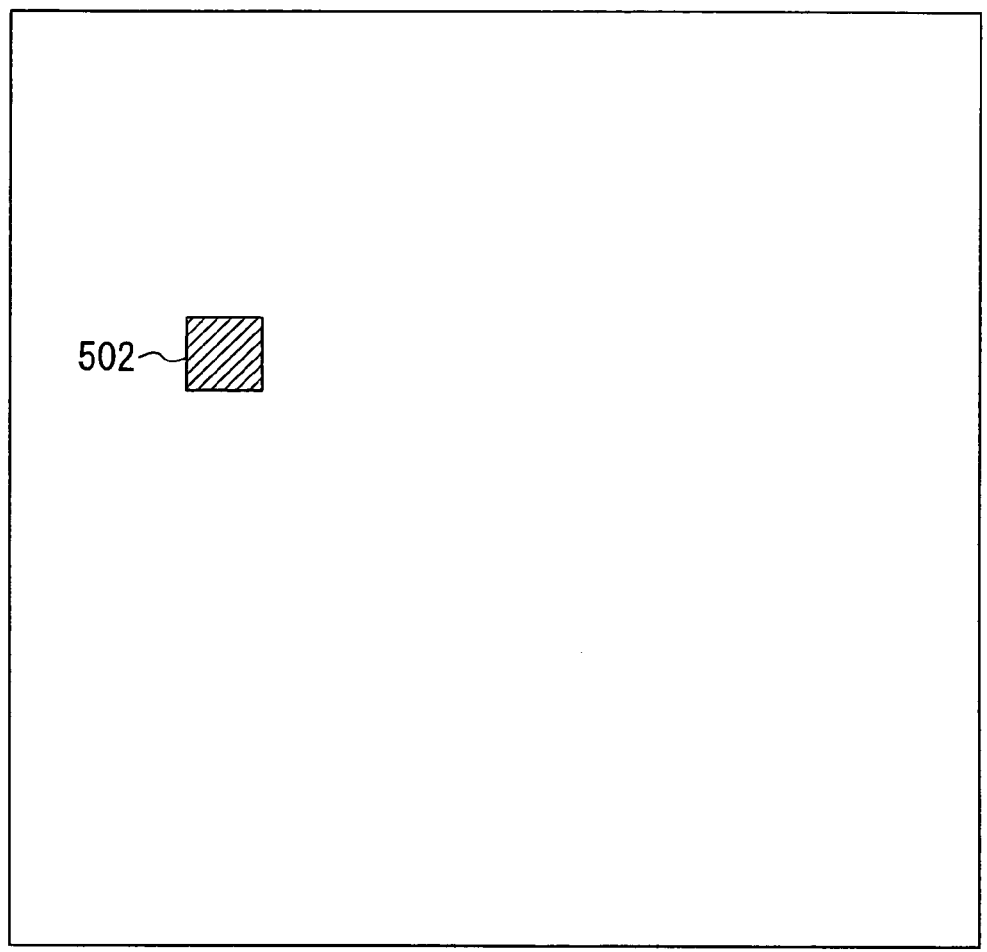
FIG. 2B is also a drawing showing the example of the reference relationship for the target encoding data for switching the code table.

In another example shown in FIGS. 2A and 2B, the present target encoding data of the camera C2 belongs to a block 502 (in this example, block-base encoding as defined in MPEG-2 is assumed), and a position 501 in an image of the camera C1 corresponds to the position of the block 502. A position is specified by shifting the position 501 by a distance corresponding to the global parallax vector, and a code table is selected in accordance with the target encoding data of a plurality of blocks (indicated by reference symbols C, D, E, and F in FIG. 2A) corresponding to the vicinity of this specified position, and the present target encoding data is encoded using this code table.

In the following embodiment, a specific example of encoding a multi-viewpoint video image obtained using two cameras will be explained in detail.

Figure 3:
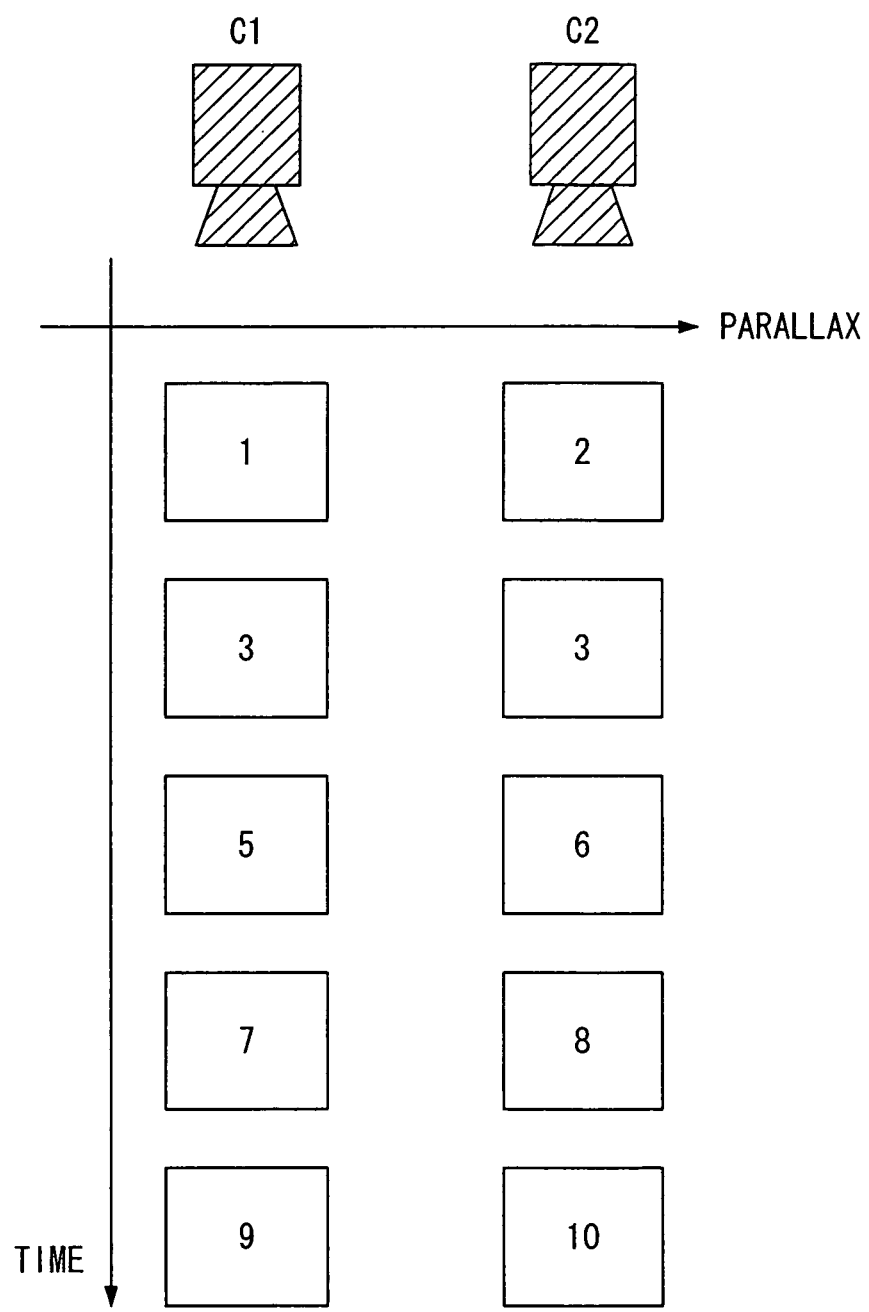
FIG. 3 is a diagram showing the configuration of cameras in an embodiment in accordance with the present invention.

FIG. 3 shows a general configuration of cameras used in the present embodiment. In FIG. 3, each rectangular figure indicates a frame (i.e., an image or picture) of each camera.

As shown in FIG. 3, in the present embodiment, cameras C1 and C2 are used, and all of the target encoding data of a frame from camera C1 is encoded before encoding that of camera C2 of the same time, and in entropy encoding of all target encoding data of the frame of camera C2, the target encoding data of camera C1 is referred to, which has already been encoded.

Below, for convenience of explanation, it is assumed that frames are encoded in the order of numbers assigned to the frames in FIG. 3. In addition, in the scanning of blocks performed in that encoding of target encoding data, scanning is performed from the top row, and from the left in each row.

In the present invention, an optimum code table is selected for each target encoding data. In the present embodiment, it is assumed that a macroblock type is encoded as the target encoding data, and switching of the code table for encoding the macroblock type will be specifically explained. The macroblock type is data for indicating a motion compensation method or an intra prediction method for each block, and is represented as "MBtype" which is an integer index. In the present embodiment, 12 kinds of MBtype values are present (i.e., MBtype=0, 1, . . . , 11).

In addition, in the entropy encoding of the target encoding data, one of the following is performed: (i) context-dependent entropy encoding which uses target encoding data in the vicinity of a block corresponding to the present target encoding data, or (ii) context-dependent entropy encoding which uses that target encoding data and also already-encoded target encoding data of a frame of another camera. In each method, appropriate code tables are prepared in advance.

Figure 4:
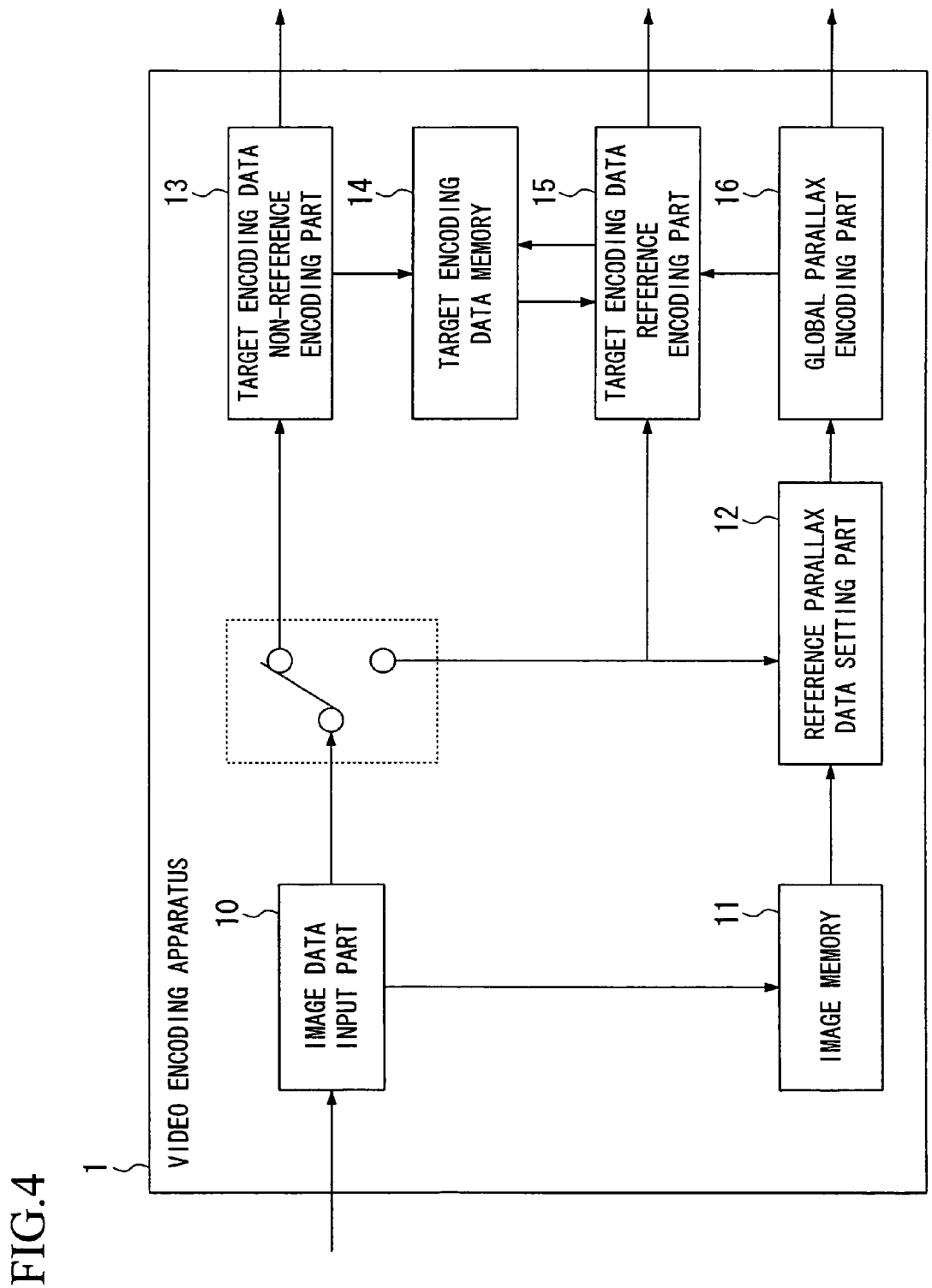
FIG. 4 is a diagram showing the structure of a video encoding apparatus in the embodiment.

FIG. 4 shows the structure of a video encoding apparatus 1 used in the present embodiment.

The video encoding apparatus 1 has an image data input part 10 for inputting frames of the cameras C1 and C2 in the order of the frames indicated in FIG. 3, an image memory 11 for storing a frame of the camera C1, a reference parallax data setting part 12 for obtaining a reference parallax data (a global parallax vector in the present embodiment) between frames of the cameras C1 and C2, a target encoding data non-reference encoding part 13 for encoding the target encoding data of the camera C1, a target encoding data memory 14 for storing block data (i.e., target encoding data) of the camera C1, a target encoding data reference encoding part 15 for encoding target encoding data of the camera C2, and a global parallax encoding part 16 for encoding the global parallax vector.

Figure 5:
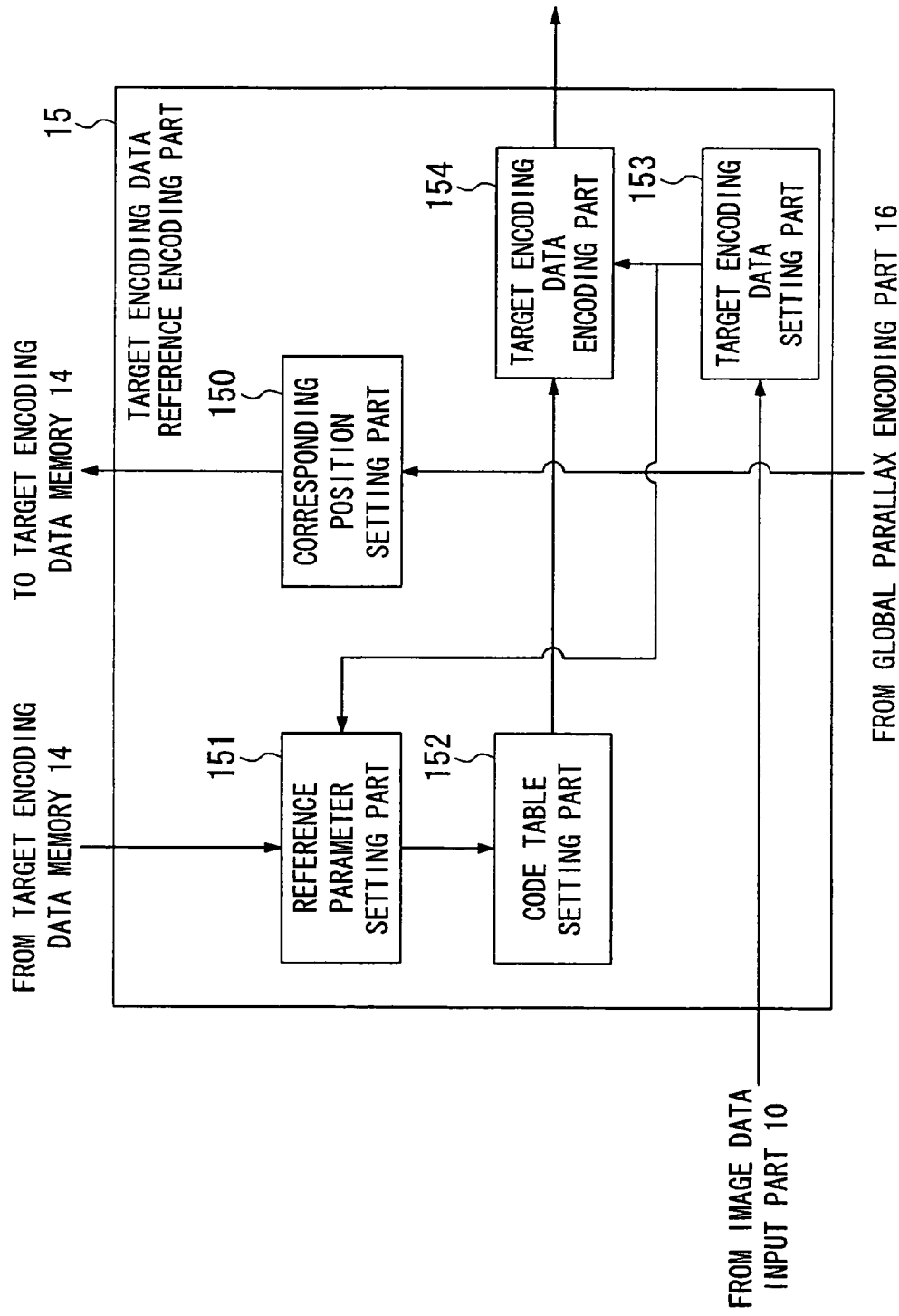
FIG. 5 is a diagram showing the structure of a target encoding data reference encoding part in the embodiment.

FIG. 5 shows a detailed configuration of the target encoding data reference encoding part 15 in the video encoding apparatus 1.

As shown in FIG. 5, the target encoding data reference encoding part 15 has a corresponding position setting part 150 for obtaining a corresponding position based on the global parallax vector, a reference parameter setting part 151 for setting a reference parameter so as to set the code table based on the target encoding data of the cameras C1 and C2, a code table setting part 152 for setting the code table based on the reference parameter, a target encoding data setting part 153 for setting the target encoding data based on an image of the camera C2, and a target encoding data encoding part 154 for encoding the target encoding data of the camera C2.

Figure 6:
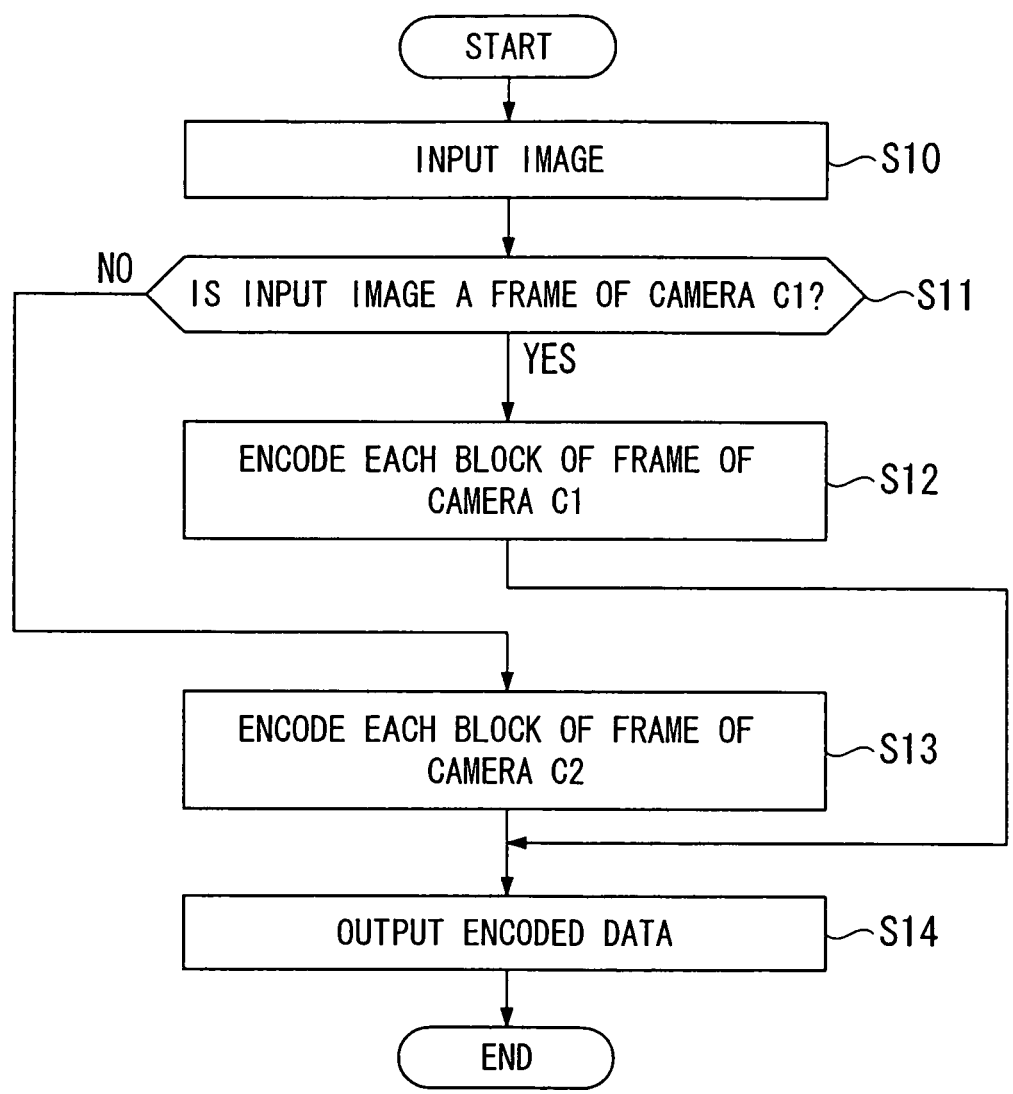
FIG. 6 is a diagram showing an operation flow executed by the video encoding apparatus in the embodiment.

FIG. 6 shows a flow of operation executed by the video encoding apparatus 1 having the above-described structure.

As shown in the operation flow, first, frames of the cameras C1 and C2 are alternately input into the image data input part 10 in the order of the frames indicated by the numbers shown in FIG. 3 (see step S10).

When the input frame belongs to the camera C1, target encoding data of each block is encoded in the target encoding data non-reference encoding part 13 (see steps S11 and S12). In addition, the image memory 11 has a capacity of one frame, and always stores the latest input frame of the camera C1.

On the other hand, when the input frame belongs to the camera C2, the target encoding data of each block is encoded in the target encoding data reference encoding part 15 (see steps S11 and S13). In the encoding of the target encoding data of the frame of the camera C2, the global parallax vector is used which is obtained in the reference parallax data setting part 12 in advance.

Lastly, encoded data of the target encoding data as generated above is output (see step S14).

Figure 7:
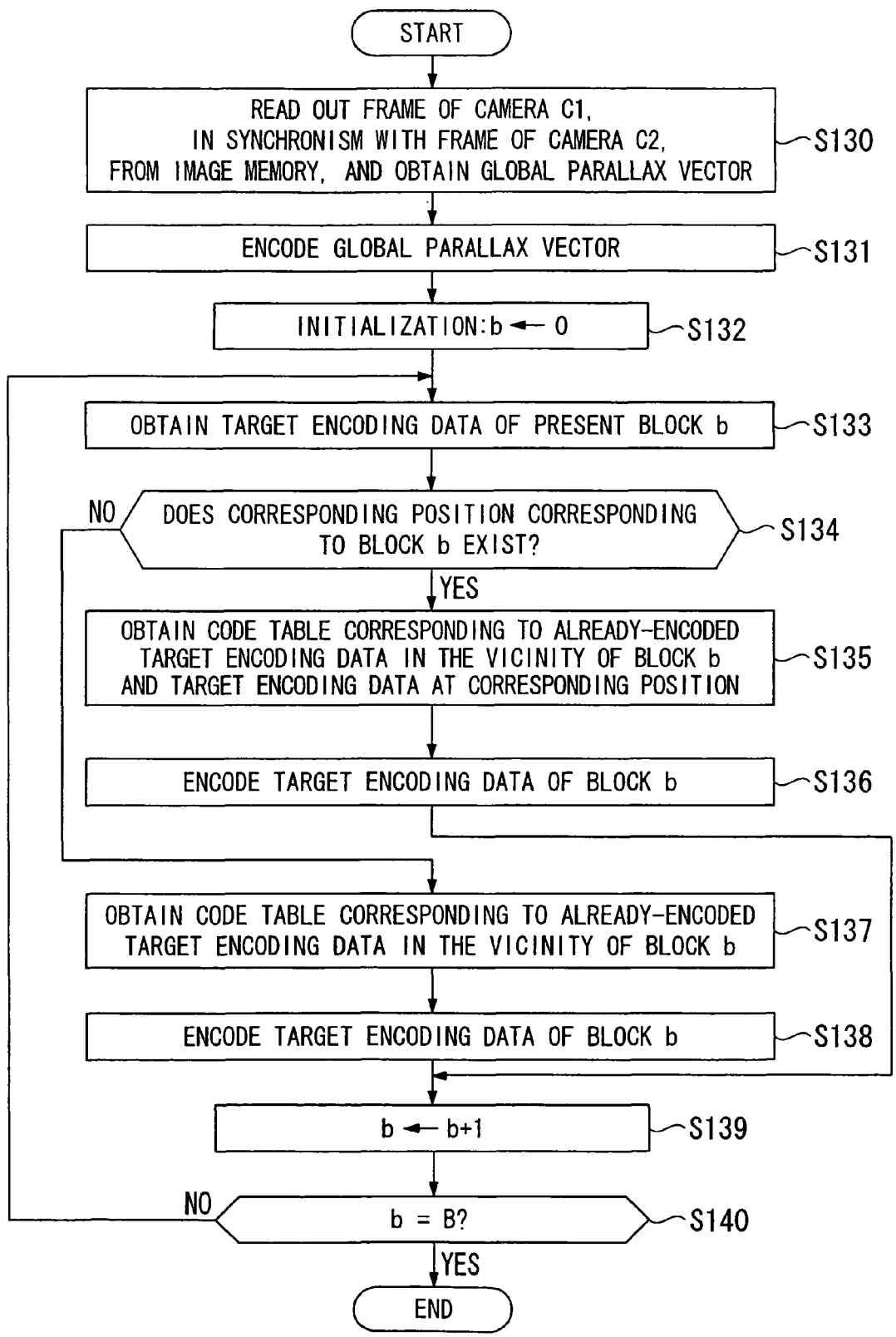
FIG. 7 is a diagram showing an operation flow of the encoding of the target encoding data in the image obtained by the camera C2 in the embodiment.

FIG. 7 shows a detailed operation flow of the encoding of the target encoding data of the camera C2.

An image of the camera C1 is input from the image memory 11 into the reference parallax data setting part 12, and an image of the camera C2 is input from the image data input part 10 into the reference parallax data setting part 12. Then, a global parallax vector is obtained in the reference parallax data setting part 12 (see step S130).

Various kinds of methods may be used for computing the global parallax vector. Here, the global parallax vector is computed as an average vector of parallax vectors for each block (e.g., macroblock).

That is, with given pixel values $i_b(i, j)$, where $i=0, 1, \ldots, I-1$, and $j=0, 1, \ldots, J-1$, of a "b"th block ($b=0, 1, \ldots, B-1$) of the camera C2, and pixel values $i_{i',j'}(i, j)$, where $i=0, 1, \ldots, I-1$, and $j=0, 1, \ldots, J-1$, of a block which has a size of I×J and has the upper-left pixel position (i', j') in a relevant image of the camera C1, the reference parallax data setting part 12 performs block matching for each block of the camera C2 based on the following evaluation function:

$$E(b, i', j') = \Sigma_i \Sigma_j (i_b(i,j) - i_{i',j'}(i,j))^2$$

where $\Sigma_i$ means the sum with respect to $i=0$ to $I-1$, and $\Sigma_j$ means the sum with respect to $j=0$ to $J-1$.

With given parallax vectors $<d_b>$ obtained by minimizing $E(b, i', j')$ for each block, the global parallax vector $<d>$ may be computed by the following formula:

$$<d>=\Sigma<d_b>/B$$

where $\Sigma$ means the sum with respect to b=0 to B−1.

The global parallax vector as obtained above is input into and encoded by the global parallax encoding part 16 (see step S131).

In the present embodiment, irreversible encoding of the global parallax vector is performed, wherein entropy-encoding is performed while quantization is performed with a step size of 1 (which is equivalent to mapping to the closest integer).

Next, in order to entropy-encode target encoding data with respect to each block, the target encoding data is obtained in the target encoding data setting part 153 (see step S133). Specifically, target encoding data such as motion vectors due to motion compensation, data of MBtype, or coefficients of orthogonal transformation is obtained.

Next, for each block, the target encoding data is encoded in the target encoding data encoding part 154. In this process, the corresponding position setting part 150 determines whether a corresponding position exists in the relevant frame of the camera C1 by using the global parallax vector which has been encoded and decoded (see step S134).

Figure 8A:
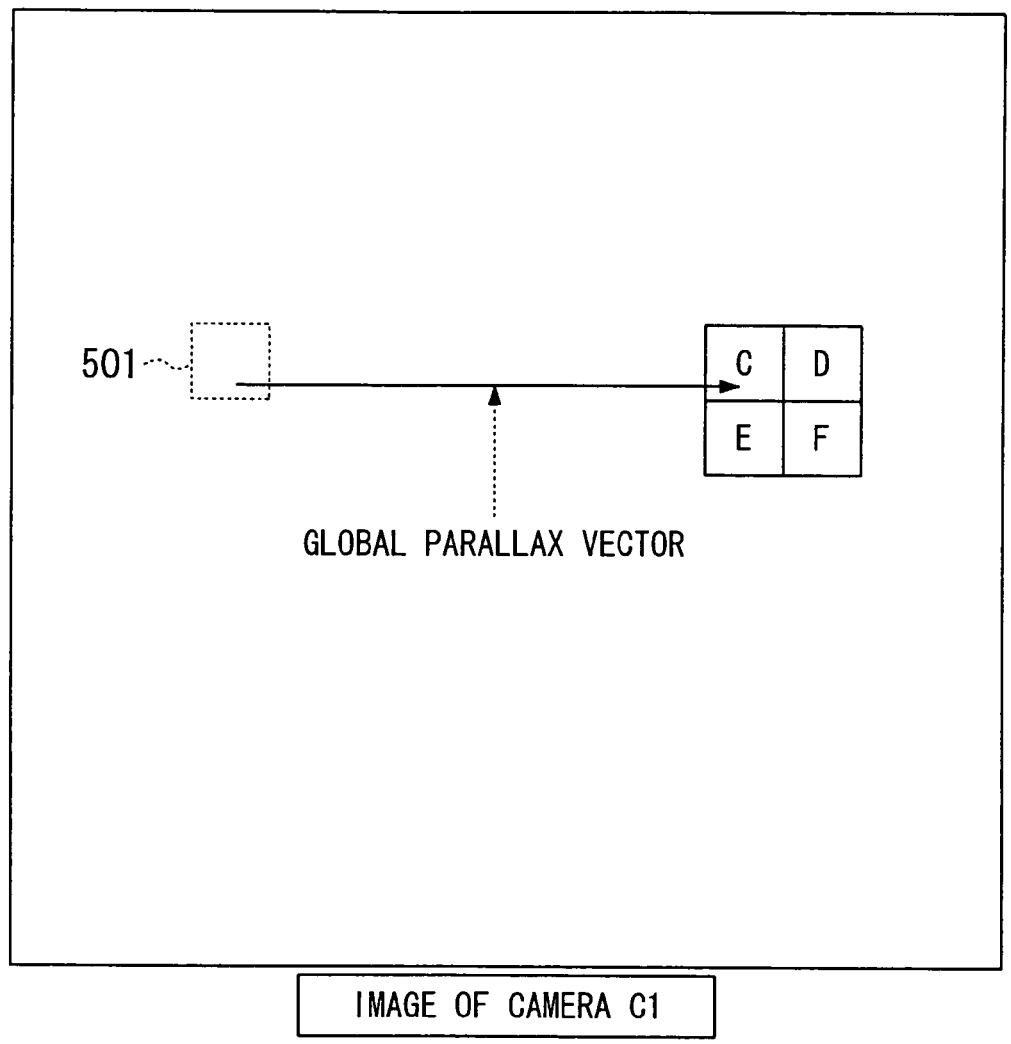
FIG. 8A is a drawing showing an example of the reference relationship with respect to the target encoding data for switching the code table.
Figure 8B:
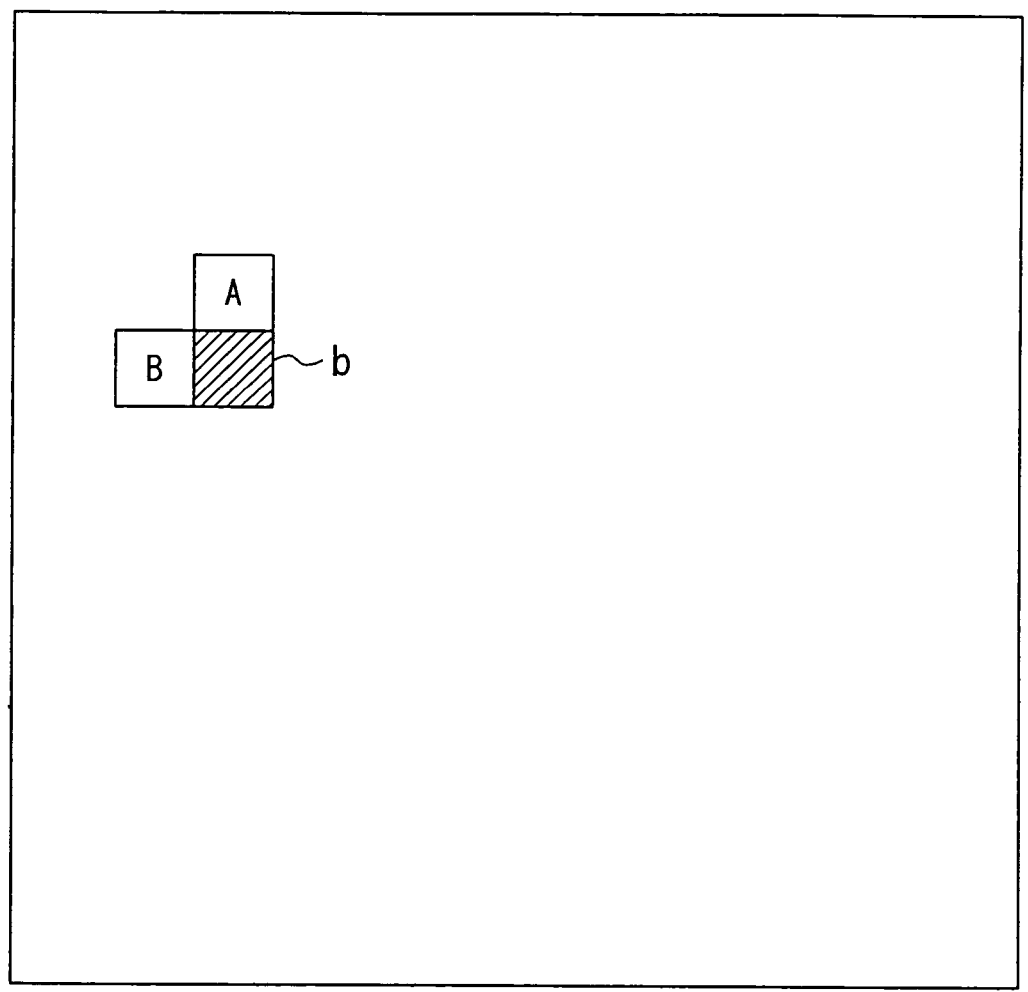
FIG. 8B is also a drawing showing the example of the reference relationship for the target encoding data for switching the code table.

In the present embodiment, as shown in FIGS. 8A and 8B, the corresponding position is defined as positions of four blocks which are closest to a position obtained by shifting the position 501 corresponding to the block b in the image of the camera C1 by a distance corresponding to the global parallax vector. Specifically, with given position $I_b$ at the upper-left corner of the present block b, a set of positions of four blocks having the upper-left corners whose positions are closest to $I_b+<d>$ is determined as the corresponding position. If the distance between $I_b+<d>$ and the position of the upper-left corner of a relevant block is larger than a predetermined threshold maxDist, the block does not form a corresponding position.

When the corresponding position setting part 150 determines that no corresponding position exists, switching of the code table for entropy encoding is performed by referring only to a block which has been encoded in the same image.

That is, when no corresponding position exists, the reference parameter setting part 151 obtains a set of MBtypes (e.g., 0, 5) of the blocks indicated by reference symbols A and B in FIG. 8B.

In accordance with this result, the code table setting part 152 selects a code table corresponding to the set of MBtypes (here, 0, 5) for entropy encoding (see step S137). The code table selected here is the same as that used for the camera C1. In addition, the code table setting part 152 stores code tables corresponding to all possible combinations of MBtype values.

After the selection of the code table, the target encoding data encoding part 154 outputs a code in this code table, which corresponds to the MBtype of the present block (see step S138), that is, the target encoding data of the present block is encoded.

On the other hand, when it is determined by the corresponding position setting part 150 that a corresponding position exists (i.e., positions of blocks C, D, E, and F in FIG. 8A), the reference parameter setting part 151 obtains the most frequently appearing value of MBtype with respect to the four corresponding positions, and determines a final set of MBType values based on the most frequently appearing MBtype value and a set of the MBtype values of the blocks indicated by reference numerals A and B in FIG. 8B. Specifically, the data that is referred to is (i) already-encoded target encoding data in the vicinity of the present target block b in the image to be presently encoded, and (ii) the target encoding data at the corresponding positions in the already-encoded reference image.

For example, when the set of MBtype values of the four corresponding positions is (0, 5, 5, 4), the most frequently appearing value is 5. Additionally, when the set of MBtype values of the blocks indicated by reference symbols A and B in FIG. 8B is (0, 5), the reference parameter setting part 151 obtains a set of MBtype values (0, 5, 5) based on the above MBtype values.

Accordingly, the code table setting part 152 selects a code table corresponding to this set of MBtype values (0, 5, 5) for entropy encoding (see step S135).

After this selection of the code table, the target encoding data encoding part 154 selects a code in this code table which corresponds to the MBtype of the present block (see step S136).

The above processes are executed repeatedly until the target encoding data of all blocks in the relevant image is encoded (see steps S132, S139, and S140).

As described above, the video encoding apparatus 1 in accordance with the present invention uses parallactic correlation so as to encode target encoding data to be entropy-encoded.

Below, a video decoding apparatus in accordance with the present invention will be explained.

Figure 9:
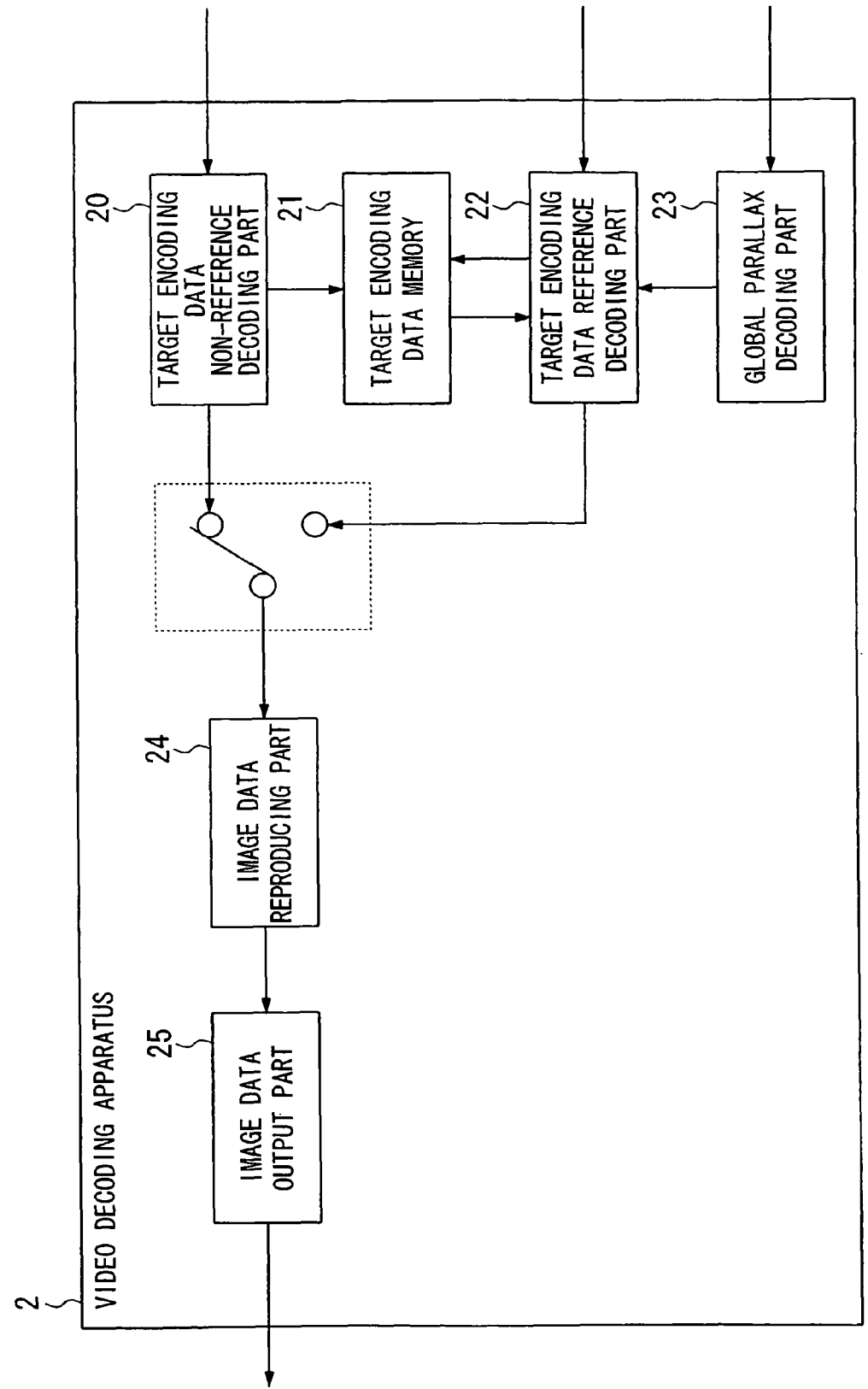
FIG. 9 is a diagram showing the structure of a video decoding apparatus in the embodiment.

FIG. 9 shows the structure of a video decoding apparatus 2 used in the present embodiment. The video decoding apparatus 2 shown in FIG. 9 has a target encoding data non-reference decoding part 20 for decoding the target encoding data with respect to the camera C1, a target encoding data memory 21 for storing the target encoding data decoded with respect to the camera C1, a target encoding data reference decoding part 22 for decoding the target encoding data with respect to the camera C2, a global parallax decoding part 23 for decoding the global parallax vector, an image data reproducing part 24 for reproducing an image based on the target encoding data, an image data output part 25 for outputting a reproduced image.

Figure 10:
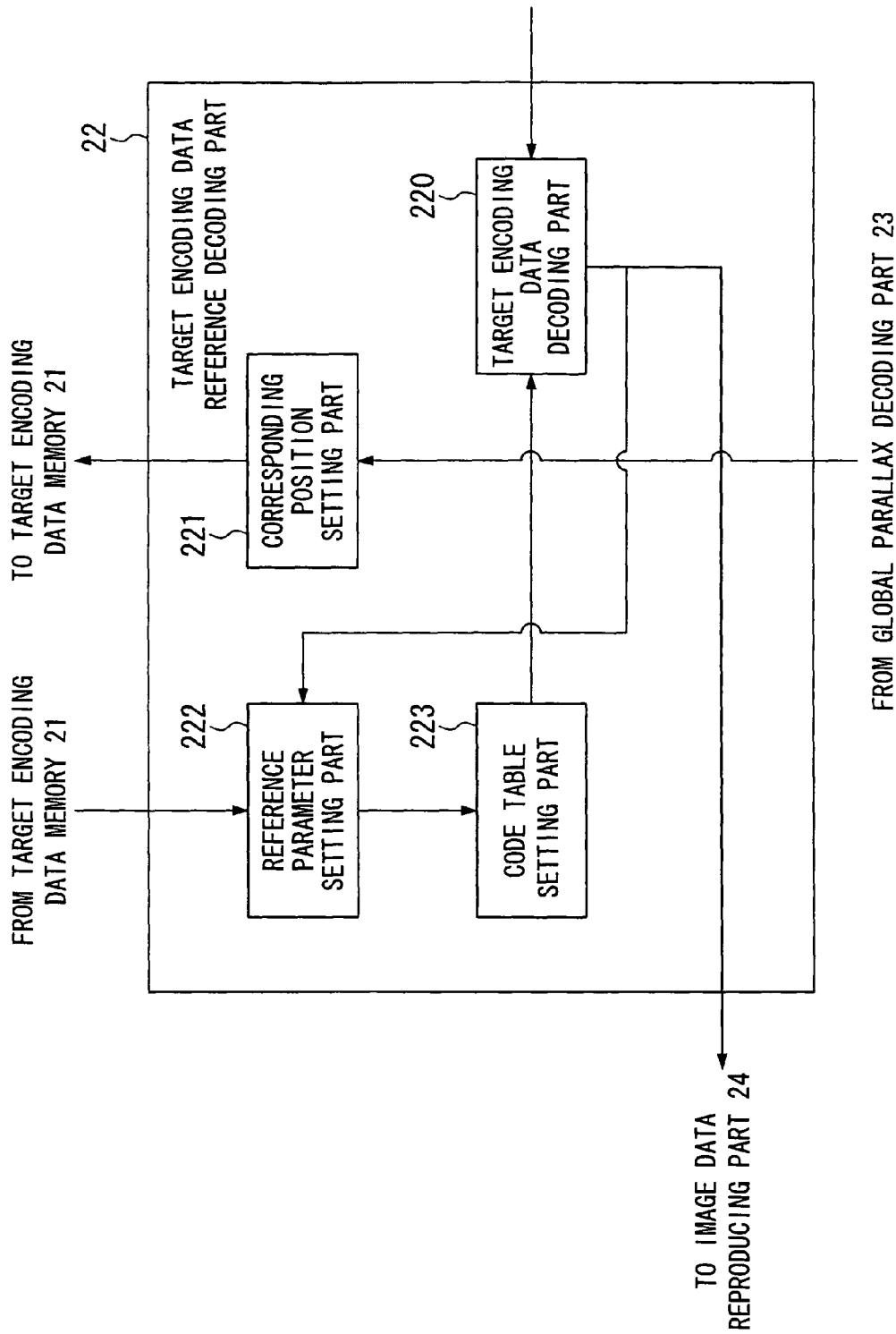
FIG. 10 is a diagram showing the structure of a target encoding data reference decoding part in the embodiment.

FIG. 10 shows a detailed configuration of the target encoding data reference decoding part 22 in the video decoding apparatus 2.

As shown in FIG. 10, the target encoding data reference decoding part 22 has a target encoding data decoding part 220 for decoding the target encoding data with respect to the camera C2, a corresponding position setting part 221 for obtaining a corresponding position based on the decoded global parallax vector, a reference parameter setting part 222 for setting a reference parameter so as to determine a code table, based on already-decoded target encoding data of the cameras C1 and C2, and a code table setting part 223 for determining a code table based on the reference parameter.

Figure 11:
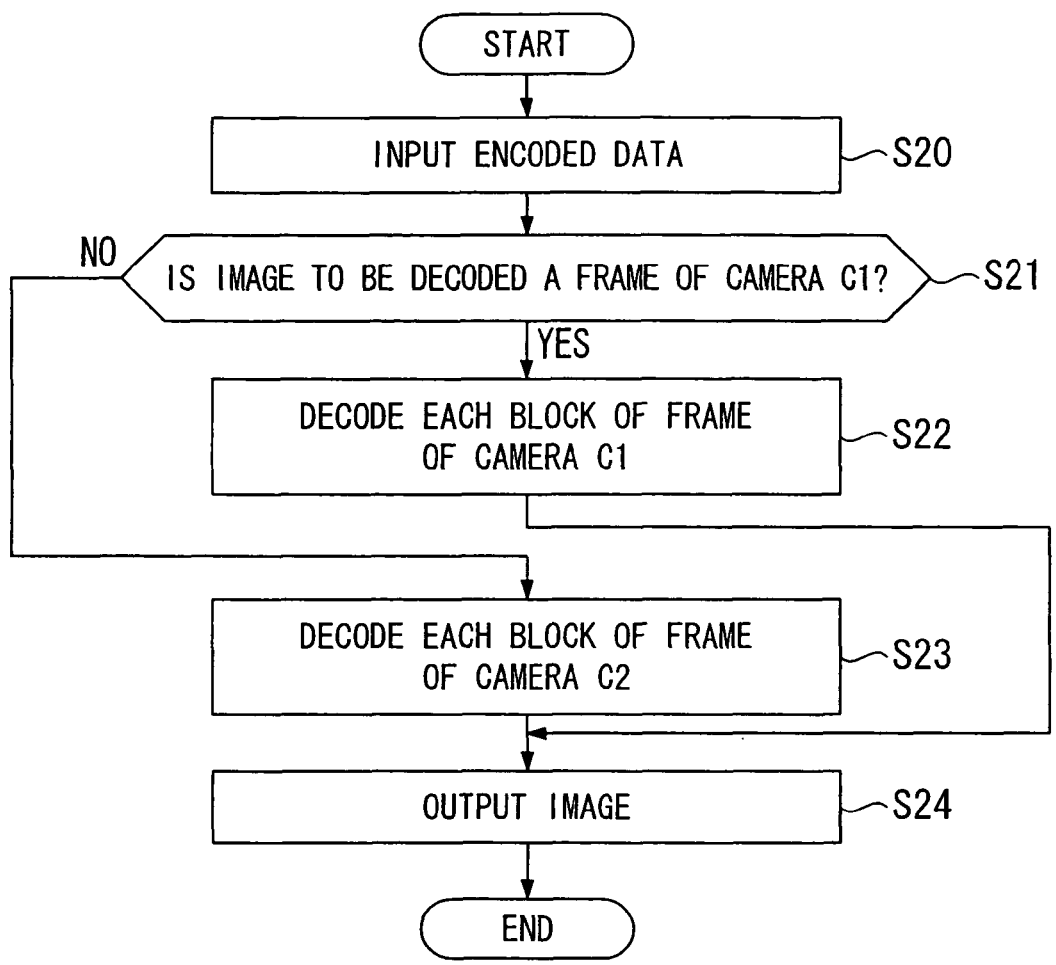
FIG. 11 is a diagram showing an operation flow executed by the video decoding apparatus in the embodiment.

FIG. 11 shows an operation flow executed by the video decoding apparatus 2 having the above structure.

First, encoded data of the cameras C1 and C2 is input into the video decoding apparatus 2, in the order of the frames indicated in FIG. 3 (see step S20).

In this process, the encoded data of the camera C1 is input into the target encoding data non-reference decoding part 20, and the encoded data of the camera C2 is input into the target encoding data reference decoding part 22. When the encoded data of the camera C2 is input, the encoded data of the global parallax vector is also input into the global parallax decoding part 23.

When the input encoded data is of the camera C1, the target encoding data of each block is decoded in the target encoding data non-reference decoding part 20 (see steps S21 and S22).

On the other hand, when the input encoded data is of the camera C2, the target encoding data of each block is decoded in the target encoding data reference decoding part 22 (see steps S21 and S23).

Finally, an image is reproduced based on the target encoding data as decoded above (see step S24).

Figure 12:
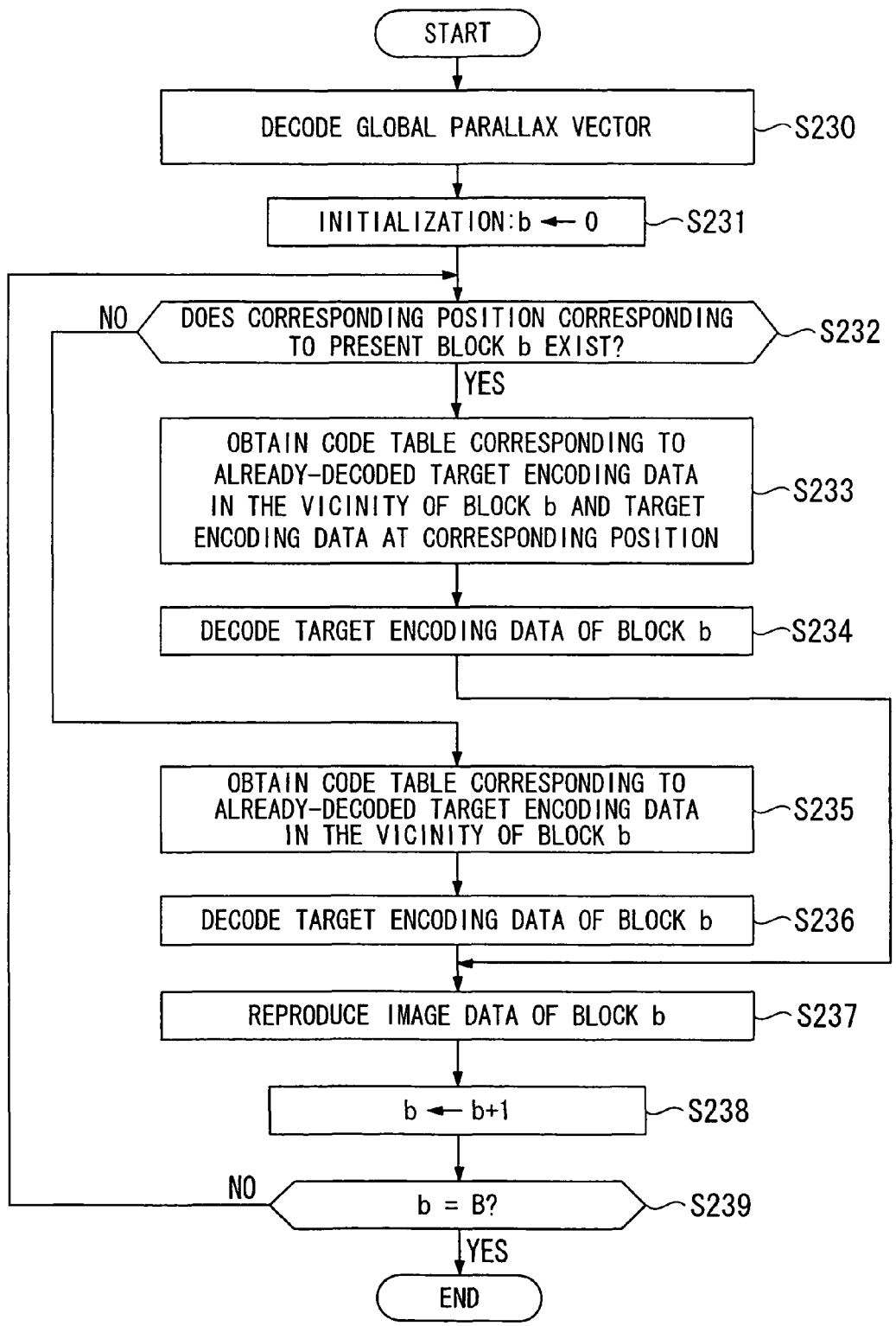
FIG. 12 is a diagram showing an operation flow of the decoding of the target encoding data in the image obtained by the camera C2 in the embodiment.

FIG. 12 shows a detailed flowchart of a process of decoding the target encoding data of the camera C2.

As for the decoding of the target encoding data of the camera C2, encoded data of the global parallax vector is input into and decoded by the global parallax decoding part 23 (see step S230).

Then, the corresponding position setting part 221 determines whether a corresponding position which corresponds to the present block b in the frame of the camera C2 exists in the frame of the camera C1, by using the decoded global parallax vector (see step S232). This determination with respect to the corresponding position is performed by a method similar to that employed in the encoding process.

When it is determined by the corresponding position setting part 221 that no corresponding position exists, switching (or selection) of the code table is performed by referring only to already-decoded target encoding data of the camera C2, and then the target encoding data of the present block is decoded (see steps S235 and S236). In this process, a reference relationship similar to that employed in the encoding process is employed.

In the above process, operations of the reference parameter setting part 222 and the code table setting part 223 are respectively similar to those of the reference parameter setting part 151 and the code table setting part 152 which are performed when no corresponding position exists in the video encoding apparatus 1, and the MBtype of the present block is decoded.

On the other hand, when it is determined by the corresponding position setting part 221 that a corresponding position exists (which correspond to blocks indicated by reference symbols C, D, E, and F in FIG. 8A, similar to the encoding process), switching (or selection) of the code table is performed by referring to already-decoded target encoding data of the camera C2 and the already-decoded target encoding data at the corresponding position of the camera C1, so as to decode the target encoding data of the present block (see steps S233 and S234).

In the above process, operations of the reference parameter setting part 222 and the code table setting part 223 are respectively similar to those of the reference parameter setting part 151 and the code table setting part 152 which are performed when a corresponding position exists in the video encoding apparatus 1, and the MBtype of the present block is decoded.

When all target encoding data of the present block has been decoded, image data of the present block is reproduced by the image data reproducing part 24 based on the decoded data, and is output from the image data output part 25 (see step S237).

The above processes are repeatedly performed until all blocks in the relevant image are decoded (see steps S231, 238, and 239).

As described above, the video decoding apparatus 2 in accordance with the present invention performs a process of decoding encoded data generated by the video encoding apparatus 1 in accordance with the present invention, by using parallactic correlation.

The encoding process in the above-described embodiment relates to entropy encoding applied to data such as a macroblock type. The present invention can also be applied to entropy encoding of other data which can be entropy-encoded. Some examples will be shown below.

Specifically, the application of the present invention to coded block pattern, coded block flag, significance map, and level data defined in H.264, is shown, which are data relating to the DCT coefficients and can be entropy-encoded.

As discussed above, in H.264, all data which can be entropy-encoded is represented by a bit sequence, and each bit is entropy-encoded by context-dependent arithmetic encoding. That is, the present invention may be applied to switching of the code table (specifically, a probability table used in arithmetic encoding) in entropy encoding of each bit.

As described above, the data called "coded block pattern" indicates which of four 8×8 blocks includes a non-zero coefficient. More specifically, this data is 4-bit data corresponding to the four 8×8 blocks, each bit indicating the presence/absence of the non-zero coefficient of the relevant block.

Figure 13A:
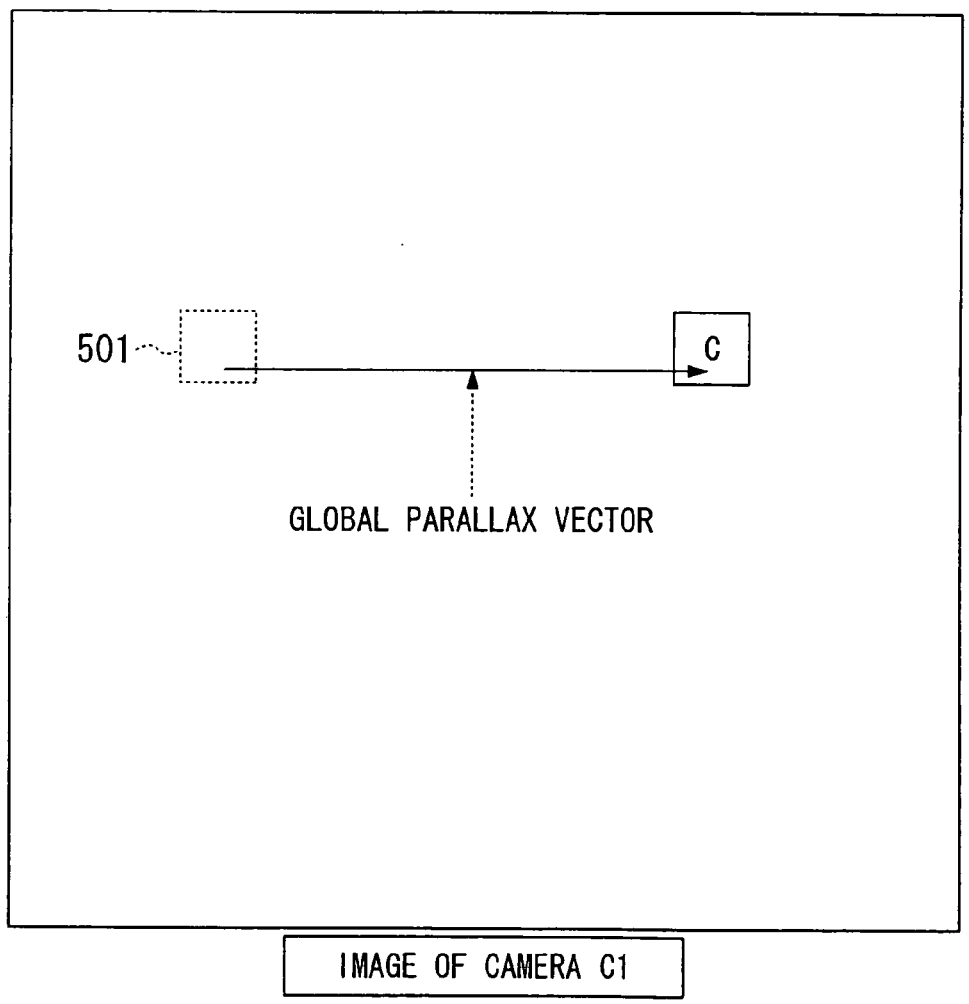
FIG. 13A is a drawing showing an example of the reference relationship with respect to the target encoding data for switching the code table in the embodiment.
Figure 13B:
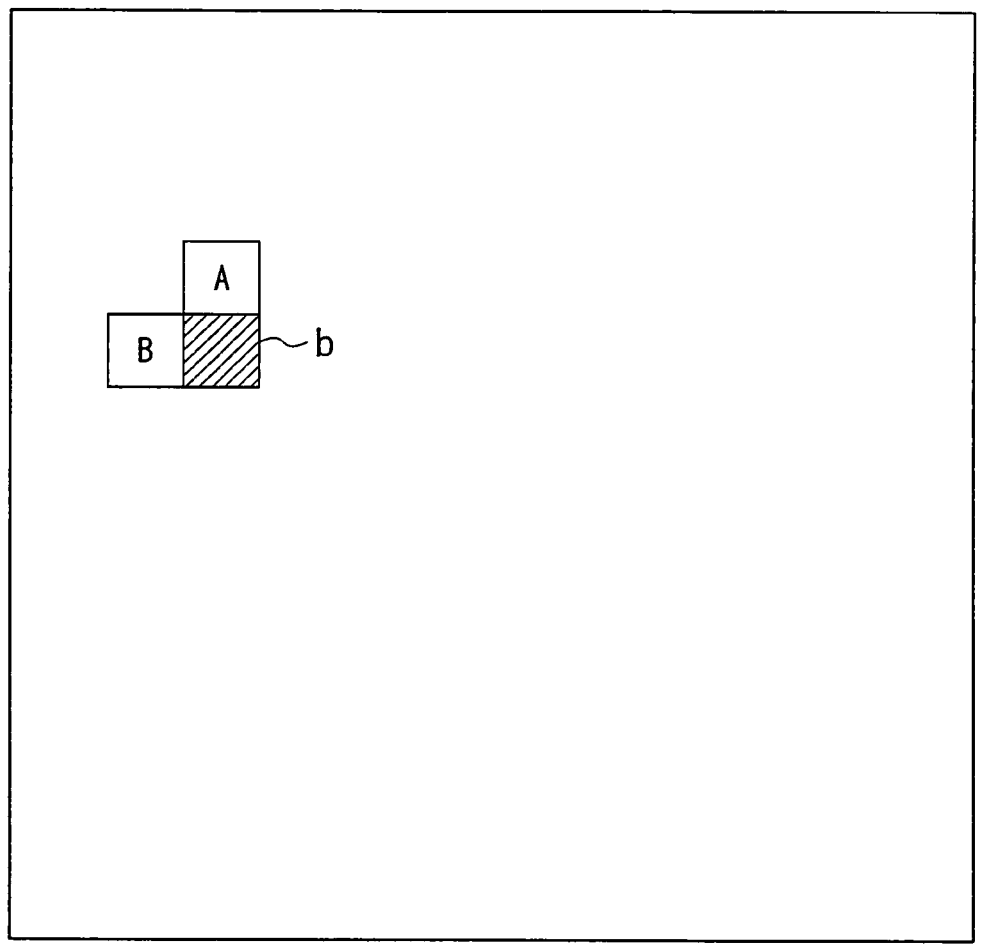
FIG. 13B is also a drawing showing the example of the reference relationship for the target encoding data for switching the code table.

When encoding bits of coded block pattern of an 8×8 block, reference as shown in FIGS. 13A and 13B may be performed for the 8×8 block. FIGS. 13A and 13B respectively correspond to FIGS. 8A and 8B, and show a positional relationship between the blocks. That is, code tables corresponding to all combinations between bits of the 8×8 blocks A, B, and C are prepared in advance, and entropy encoding may be performed using a code table corresponding to a combination of bits of the 8×8 blocks A, B, and C, which is most suitable for the target 8×8 block b to be encoded.

Also as described above, the data called "coded block flag" indicates which of four 4×4 blocks in the relevant 8×8 block (which includes the non-zero coefficient) includes the non-zero coefficient. Therefore, coded block flag has a data format similar to that of coded block pattern; thus, application of the present invention can be similarly performed.

Next, an example of an application of the present invention to entropy encoding of significance map will be shown. As described above, the data called "significance map" indicates which DCT coefficient is non-zero in the 4×4 block indicated by coded block flag. More specifically, whether a DCT coefficient is non-zero is represented by one bit, and 16 DCT coefficients in the relevant 4×4 block are scanned in a certain order. If the scanned DCT coefficient is non-zero, the bit is set to 1. Otherwise, the bit is set to 0. These bits are called "significance bits".

When the DCT coefficient is non-zero and the bit is set to 1, whether this DCT coefficient is the last non-zero coefficient is represented by one bit (i.e., if the last non-zero coefficient, the bit is set to 1. Otherwise, the bit is set to 0), and this bit is also included in significance map. This kind of bit is called the "Last bit".

When a state in which this last bit is set to 1 occurs during scanning (that is, when the DCT coefficient at the present position is the last non-zero coefficient), the following DCT coefficients need no significance bits. In addition, whether the last DCT coefficient in scanning is non-zero is obvious by referring to the already-set significance bits and last bits; thus, it is unnecessary to provide any data with respect to this last DCT coefficient.

In H.264, the significance bit and the last bit are respectively independently encoded, and the code table is switched in accordance with the position in scanning (as described above, the last DCT coefficient does not need any data; thus, 15 code tables are required). When the present invention is applied, as shown in FIGS. 13A and 13B, the code table may be switched by referring to the number of non-zero coefficients in a 4×4 block C of another camera. This is because due to characteristics of multi-viewpoint video images, the larger the number of the non-zero coefficients in the block C, the higher the probability that each of 16 significance bits of the target 4×4 block b to be encoded has a value "1" (i.e., the relevant DCT coefficient is non-zero) and that last bit has a value "0".

Finally, an example of the application of the present invention to entropy encoding of the level data is given. In H.264, a quantized value of the DCT coefficient, which is an integer, is converted into a binary bit sequence, and scanning similar to that for significance map is performed so as to entropy-encode each bit.

The code table used in this encoding is switched in accordance with the number of the quantized values having absolute values larger than 1, which have been produced in the scanning of the block. If many quantized values having absolute values larger than 1 have been produced at a time during scanning, the probability is high that a target quantized value to be encoded at that time has a large value; thus, code tables are prepared in advance in consideration of this characteristic.

When encoding a multi-viewpoint video image, if quantized values of the DCT coefficients in block C of another camera (here, C1) as shown in FIGS. 13A and 13B are large, quantized values of the presently target block to be encoded (i.e., block b) are probably also large. Therefore, when the present invention is applied, a code table corresponding to an average of the quantized values of the block C may be prepared, and entropy encoding may be performed using the code table corresponding to the average of the quantized values of the block C of another camera, which relates to the target block b to be encoded.

The present invention has been explained in accordance with an embodiment; however, the present invention is not limited to the embodiment. For example, in the embodiment, a video image obtained by two cameras C1 and C2 is the object to be processed; however, the present invention can also be applied to a video image obtained by three or more cameras.

Also in the above-described embodiment, reference parallax data is obtained in the video encoding apparatus. However, the present invention can also be applied to a case in which parallax data which has been obtained in an external device using any kind of parallax estimating method is input in advance, and encoding is performed using this parallax data as reference parallax data.

In addition, in the above embodiment, a parallax vector is used as parallax data; however, data other than the parallax vector may be used as the parallax data in the present invention.

Specifically, a global parallax model obtained by application of a global motion vector with respect to parallax may be used, an example thereof is disclosed, for example, in Reference Document 4 (Aljoscha Smolic, Thomas Sikora and Jens-Rainer Ohm, "Long-Term Global Motion Estimation and its Application for Sprite Coding, Content Description, and Segmentation", IEEE Transactions on Circuits and Systems for Video Technology, Vol. 9, No. 8, pp. 1227-1242, December, 1999).

In this case, parameters of the global parallax model are obtained in the video encoding apparatus, and these parameters are encoded. Additionally, when obtaining a corresponding position, the corresponding position is determined by applying the parameters to the global parallax model so as to obtain a global parallax vector. In the video decoding apparatus, the corresponding position is determined by applying the decoded parameters (of the global parallax model) to the global parallax model.

In addition, there are two cameras in the above embodiment, and a decoded image of one of the cameras is referred to. However, when camera parameters of each camera (i.e., the position or posture of the camera, an angle of view of a lens of the camera, or the like) are known and decoded images of two or more different cameras can be referred to, parallax data (i.e., a parallax vector) for each pixel in the image to be encoded can be estimated without referring to the image to be encoded, by using a method as shown in FIG. 14.

Figure 14:
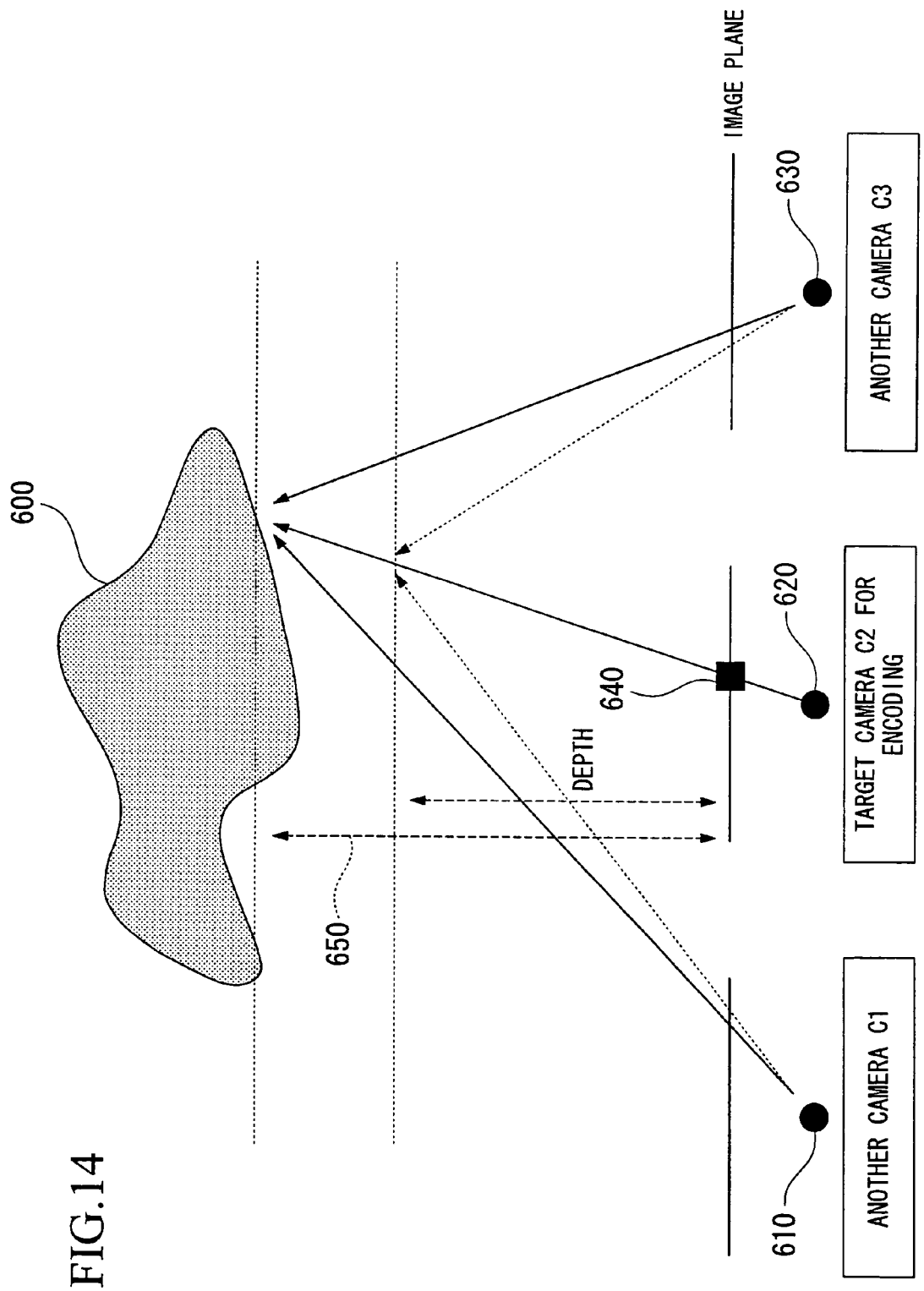
FIG. 14 is a diagram explaining the principle for estimating parallax data (i.e., a parallax vector) with respect to each pixel in an image to be encoded, without using this image.

In FIG. 14, reference numeral 620 indicates a viewing position of camera C2 which photographs a subject 600 and obtains an image to be encoded, and reference numerals 610 and 630 respectively indicate viewing positions of cameras C1 and C3 which also photograph the subject 600 (i.e., which output reference images). In addition, reference numeral 640 indicates a pixel position for which parallax is to be determined. As shown in FIG. 14, in real parallax with respect to the subject 600, the pixel value of a corresponding point in each reference image, which corresponds to the pixel position 640, should be substantially the same. Therefore, in various parallax estimation methods, pixel values at the corresponding point in each reference image are compared with respect to each of various kinds of depth, and parallax from the camera C1 or C3 can be estimated based on (i) the depth (indicated by reference numeral 650 in FIG. 14) at which the compared pixel values are closest and (ii) the known camera parameters. This process can be performed for each pixel in the image to be encoded.

If this method is executed in the structure of the above-described embodiment, the global parallax encoding part 16 in the video encoding apparatus 1 and the global parallax decoding part 23 of the video decoding apparatus 2 are unnecessary, and encoding may be performed in accordance with a process similar to that explained above, by using, for example, an average of the parallax vectors which are each estimated for pixels of a block to be encoded.

Figure 15:
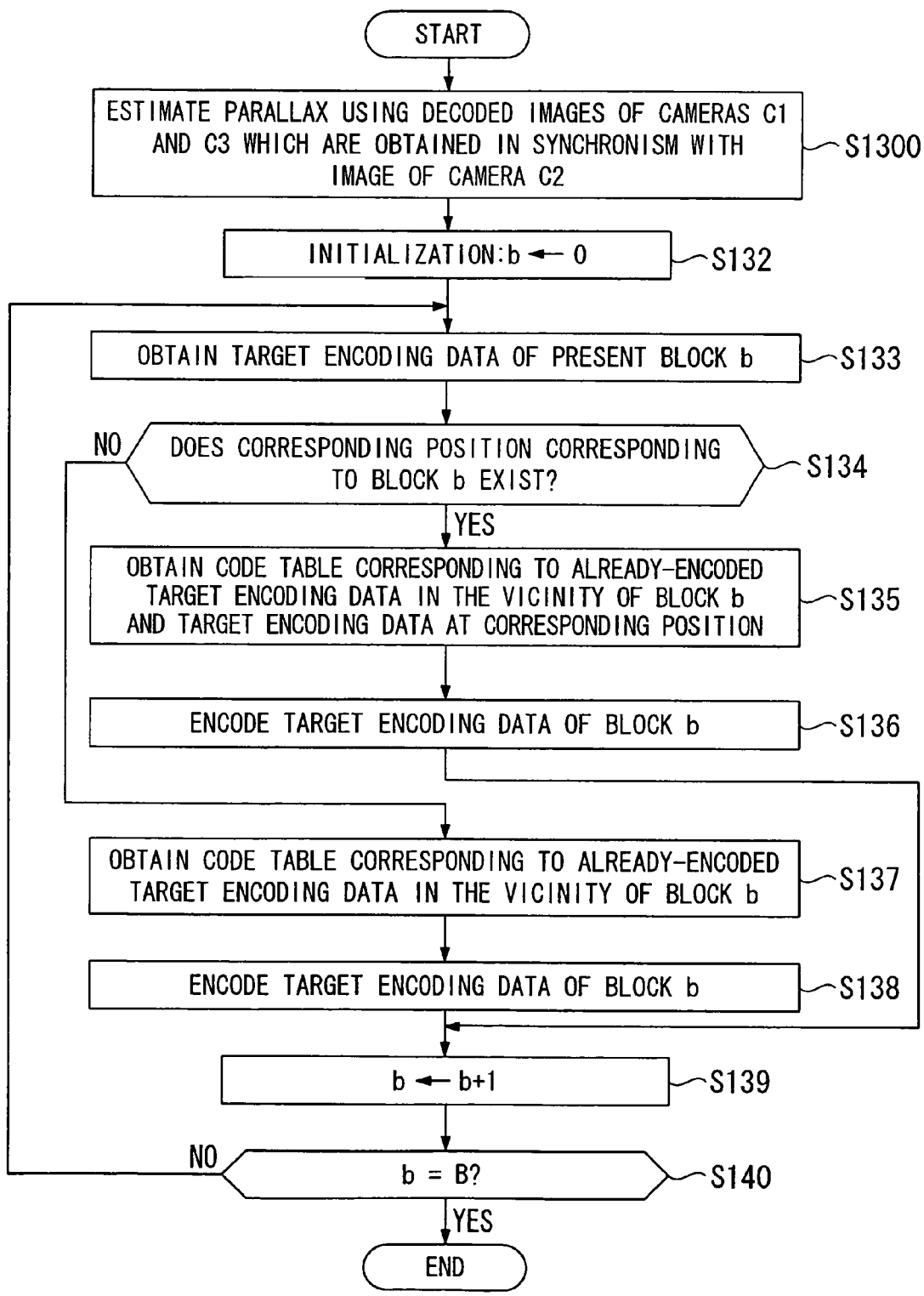
FIG. 15 is a diagram showing an operation flow of the encoding of the target encoding data in the image obtained by the camera C2 when estimating the parallax data.

Specifically, a process as shown in FIG. 15 is performed in the encoding process of target encoding data. In this flowchart, instead of steps S130 and S131 in FIG. 7, step S1300 is provided. In this step, parallax is estimated by using the above-described method, that is, using decoded images of relevant images of the cameras C1 and C3, which are obtained in synchronism with a relevant image obtained by the camera C2 to be encoded.

Figure 16:
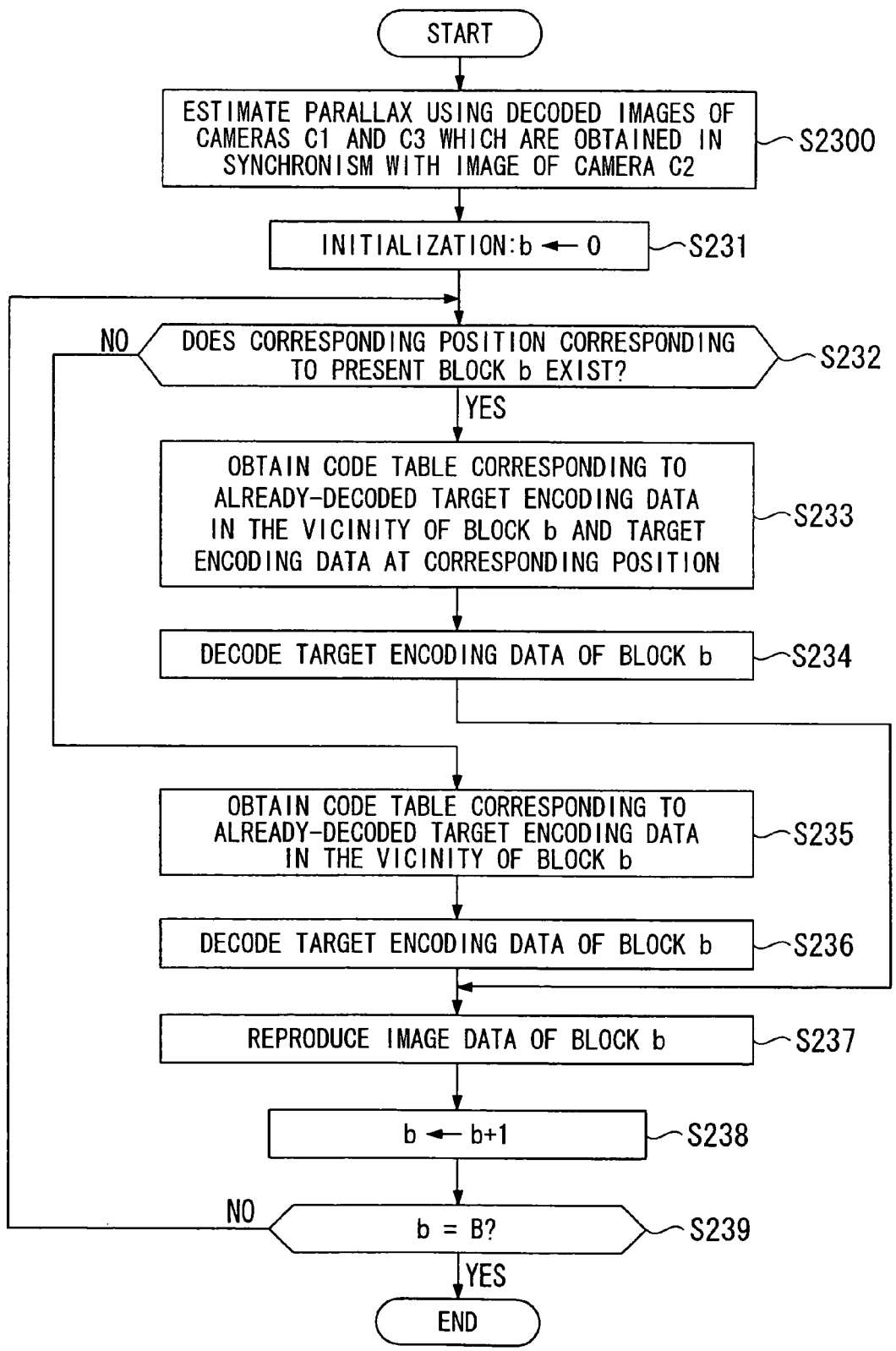
FIG. 16 is a diagram showing an operation flow of the decoding of the target encoding data in the image obtained by the camera C2 when estimating the parallax data.
Figure 17:
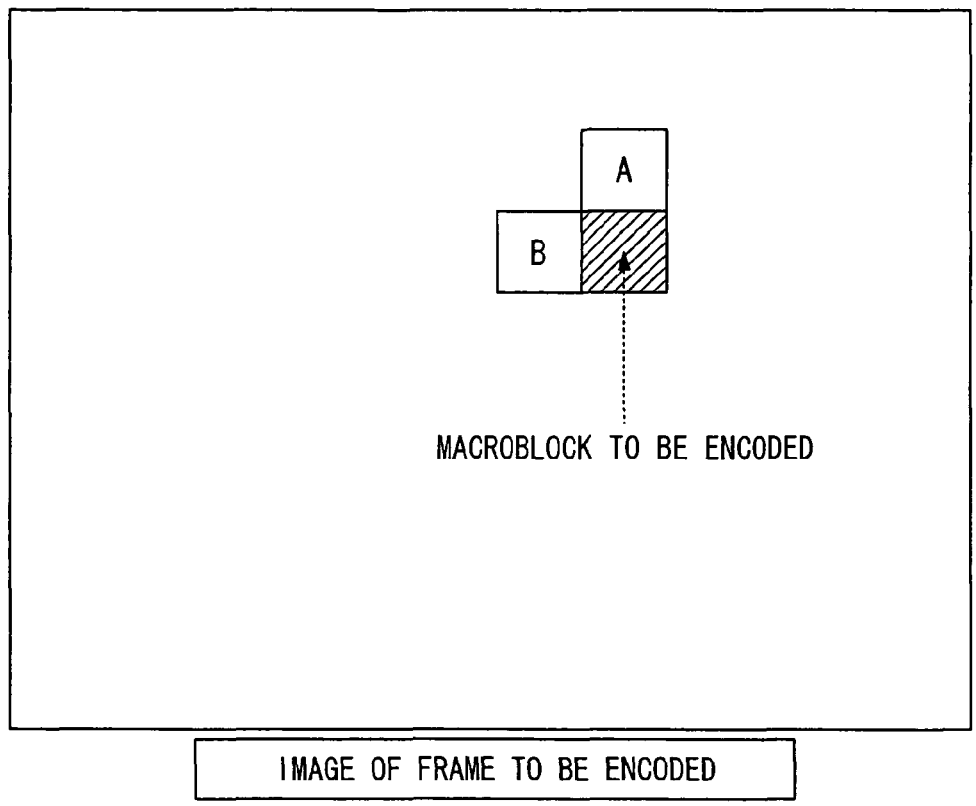
FIG. 17 is a diagram showing the concept of a reference relationship between macroblocks, used for switching the code table in H.264.
Figure 18:
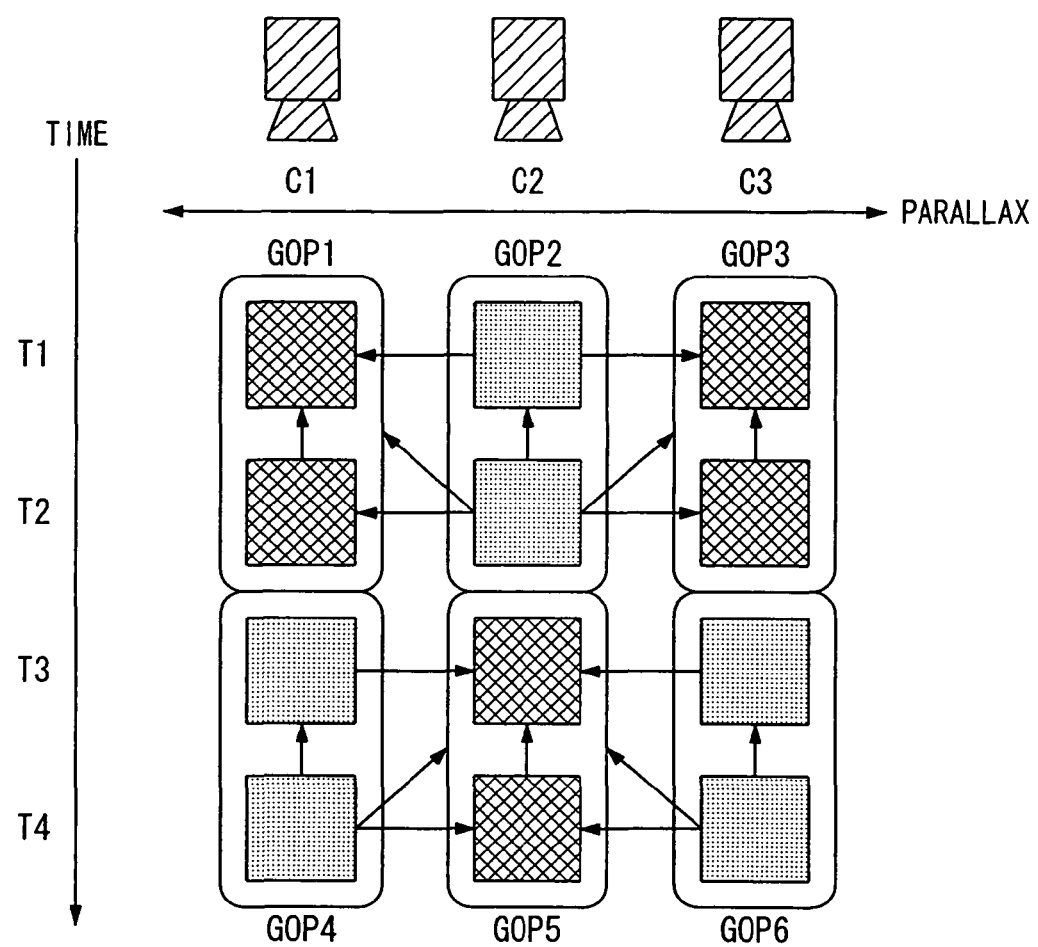
FIG. 18 is a diagram showing a conventional GOP configuration.

In the decoding process, a process as shown in FIG. 16 is performed. In this flowchart, instead of step S230 in FIG. 12, step S2300 is provided. In this step, parallax is estimated in accordance with a similar method, that is, using decoded images of relevant images of the cameras C1 and C3, which are obtained in synchronism with a relevant image obtained by the camera C2 to be encoded.

The invention claimed is:

1. A video encoding method for encoding a plurality of images as a video image, the method comprising:
   a reference parallax data setting step of setting reference parallax data which indicates a viewing difference between a first image and an already-encoded second image, in order to encode target encoding data assigned to a predetermined position in the first image;
   a corresponding position setting step of setting a corresponding position in the second image, which can correspond to the predetermined position, by using the reference parallax data;
   a code table setting step of setting a code table corresponding to target encoding data assigned to the corresponding position; and a target encoding data encoding step of encoding the target encoding data in the first image by using the code table.

2. A video encoding method in accordance with claim 1, wherein:
in the reference parallax data setting step, global parallax data indicating an average viewing difference between the first image and the second image is determined as the reference parallax data, and
the video encoding method further comprises:
a global parallax data encoding step of encoding the global parallax data.

3. A video encoding method in accordance with claim 1, wherein:
the code table set in the code table setting step corresponds to the target encoding data at the corresponding position in the second image and target encoding data which has been encoded and is assigned to a position in the vicinity of the predetermined position in the first image.

4. A video encoding method in accordance with claim 1, wherein:
in the code table setting step, the code table is set by also referring to target encoding data assigned to a position in the vicinity of the corresponding position in the second image.

5. A video encoding method in accordance with claim 1, wherein:
the target encoding data is defined for each block obtained by dividing the relevant image; and
in the corresponding position setting step, the position of a block in the second image, which corresponds to the predetermined position, is shifted based on the reference parallax data, and the position of a block having a maximum overlapping area with the shifted block is determined as the corresponding position.

6. A video encoding method in accordance with claim 1, wherein:
the target encoding data is defined for each block obtained by dividing the relevant image; and
in the corresponding position setting step, the position of a block in the second image, which corresponds to the predetermined position, is shifted based on the reference parallax data, and a set of positions of a plurality of blocks in the vicinity of the shifted position is determined as the corresponding position.

7. A video encoding method in accordance with any one of claims 3 and 4, wherein:
the code table set in the code table setting step corresponds to a most frequently appearing value of the target encoding data used for setting the code table.

8. A video encoding method in accordance with any one of claims 3 and 4, wherein:
the code table set in the code table setting step corresponds to an average value of the target encoding data used for setting the code table.

9. A video encoding program embodied in a non-transitory computer readable medium for making a computer execute a process used for implementing the video encoding method in accordance with claim 1, further comprising:
a reference parallax data setting step of setting reference parallax data which indicates a viewing difference between a first image and an already-encoded second image, in order to encode target encoding data assigned to a predetermined position in the first image;
a corresponding position setting step of setting a corresponding position in the second image, which can correspond to the predetermined position, by using the reference parallax data;
a code table setting step of setting a code table corresponding to target encoding data assigned to the corresponding position; and
a target encoding data encoding step of encoding the target encoding data in the first image by using the code table.

10. A video decoding method for decoding encoded data generated by encoding a plurality of images as a video image, the method comprising:
a reference parallax data setting step of setting reference parallax data which indicates a viewing difference between a first image and an already-encoded second image, in order to decode target encoding data assigned to a predetermined position in the first image;
a corresponding position setting step of setting a corresponding position in the second image, which can correspond to the predetermined position, by using the reference parallax data;
a code table setting step of setting a code table corresponding to target encoding data assigned to the corresponding position; and
a target encoding data decoding step of decoding the target encoding data in the first image by using the code table.

11. A video decoding method in accordance with claim 10, wherein:
in the reference parallax data setting step, global parallax data indicating an average viewing difference between the first image and the second image is decoded, and this decoded data is used as the reference parallax data.

12. A video decoding method in accordance with claim 10, wherein:
the code table set in the code table setting step corresponds to the target encoding data at the corresponding position in the second image and target encoding data which has been decoded and is assigned to a position in the vicinity of the predetermined position in the first image.

13. A video decoding method in accordance with claim 10, wherein:
in the code table setting step, the code table is set by also referring to target encoding data assigned to a position in the vicinity of the corresponding position in the second image.

14. A video decoding method in accordance with claim 10, wherein:
the target encoding data is defined for each block obtained by dividing the relevant image; and
in the corresponding position setting step, the position of a block in the second image, which corresponds to the predetermined position, is shifted based on the reference parallax data, and the position of a block having a maximum overlapping area with the shifted block is determined as the corresponding position.

15. A video decoding method in accordance with claim 10, wherein:
the target encoding data is defined for each block obtained by dividing the relevant image; and
in the corresponding position setting step, the position of a block in the second image, which corresponds to the predetermined position, is shifted based on the reference parallax data, and a set of positions of a plurality of blocks in the vicinity of the shifted position is determined as the corresponding position.

16. A video decoding method in accordance with any one of claims 12 and 13, wherein:
the code table set in the code table setting step corresponds to a most frequently appearing value of the target encoding data used for setting the code table.

17. A video decoding method in accordance with any one of claims 12 and 13, wherein:
the code table set in the code table setting step corresponds to an average value of the target encoding data used for setting the code table.

18. A video decoding program embodied in a non-transitory computer readable medium for making a computer execute a process used for implementing the video decoding method in accordance with claim 10, further comprising:
a reference parallax data setting step of setting reference parallax data which indicates a viewing difference between a first image and an already-encoded second image, in order to decode target encoding data assigned to a predetermined position in the first image;
a corresponding position setting step of setting a corresponding position in the second image, which can correspond to the predetermined position, by using the reference parallax data;
a code table setting step of setting a code table corresponding to target encoding data assigned to the corresponding position; and
a target encoding data decoding step of decoding the target encoding data in the first image by using the code table.

19. A video encoding apparatus for encoding a plurality of images as a video image, the apparatus comprising:
a reference parallax data setting part for setting reference parallax data which indicates a viewing difference between a first image and an already-encoded second image, in order to encode target encoding data assigned to a predetermined position in the first image;
a corresponding position setting part for setting a corresponding position in the second image, which can correspond to the predetermined position, by using the reference parallax data;
a code table setting part for setting a code table corresponding to target encoding data assigned to the corresponding position; and
a target encoding data encoding part for encoding the target encoding data in the first image by using the code table.

20. A video encoding apparatus in accordance with claim 19, wherein:
the reference parallax data setting part determines global parallax data indicating an average viewing difference between the first image and the second image as the reference parallax data, and
the video encoding apparatus further comprises:
a global parallax data encoding part for encoding the global parallax data.

21. A video decoding apparatus for decoding encoded data generated by encoding a plurality of images as a video image, the apparatus comprising:
a reference parallax data setting part for setting reference parallax data which indicates a viewing difference between a first image and an already-encoded second image, in order to decode target encoding data assigned to a predetermined position in the first image;
a corresponding position setting part for setting a corresponding position in the second image, which can correspond to the predetermined position, by using the reference parallax data;
a code table setting part for setting a code table corresponding to target encoding data assigned to the corresponding position; and
a target encoding data decoding part for decoding the target encoding data in the first image by using the code table.

22. A video decoding apparatus in accordance with claim 21, wherein:
the reference parallax data setting part decodes global parallax data indicating an average viewing difference between the first image and the second image, and this decoded data is used as the reference parallax data.

* * * * *

UNITED STATES PATENT AND TRADEMARK OFFICE
CERTIFICATE OF CORRECTION

| | |
|---|---|
| PATENT NO. | : 9,088,802 B2 |
| APPLICATION NO. | : 10/586235 |
| DATED | : July 21, 2015 |
| INVENTOR(S) | : Masaki Kitahara et al. |

It is certified that error appears in the above-identified patent and that said Letters Patent is hereby corrected as shown below:

Title Page

In item (75) the city of residence listed for each inventor should be corrected to read as follows:

Masaki Kitahara, Yokohama-shi (JP); Kazuto Kamikura, Yokosuka-shi (JP); Yoshiyuki Yashima, Yokosuka-shi (JP)

Signed and Sealed this
Sixteenth Day of February, 2016

Michelle K. Lee
*Director of the United States Patent and Trademark Office*